United States Patent [19]
Nozaki et al.

[11] Patent Number: 5,193,030
[45] Date of Patent: Mar. 9, 1993

[54] ZOOM FINDER SYSTEM

[75] Inventors: Katsuhiko Nozaki; Tetsuya Abe, both of Tokyo, Japan

[73] Assignee: Asahi Kogaku Kogyo K.K., Tokyo, Japan

[21] Appl. No.: 596,102

[22] Filed: Oct. 11, 1990

Related U.S. Application Data

[62] Division of Ser. No. 426,655, Oct. 26, 1989, Pat. No. 4,992,809.

[30] Foreign Application Priority Data

| Oct. 28, 1988 | [JP] | Japan | 63-140823[U] |
| Dec. 27, 1988 | [JP] | Japan | 63-330466 |
| Dec. 27, 1988 | [JP] | Japan | 63-330467 |

[51] Int. Cl.$^5$ .............. G02B 15/14; G03B 13/02; G03B 13/10
[52] U.S. Cl. ............... 359/687; 354/219; 354/222; 354/223
[58] Field of Search ............. 350/423, 427; 354/219, 354/222, 223; 359/683, 687

[56] References Cited

U.S. PATENT DOCUMENTS

| 3,807,842 | 4/1974 | Baker | 352/78 R |
|---|---|---|---|
| 4,081,809 | 3/1978 | Kuboshima | 354/199 |
| 4,526,444 | 7/1985 | Fantone et al. | 350/501 |
| 4,545,655 | 10/1985 | Fantone et al. | 350/540 |
| 4,653,872 | 3/1987 | Takahashi | 359/688 |
| 4,690,512 | 9/1987 | Forsyth | 359/796 |
| 4,725,130 | 2/1988 | Ozawa | 350/427 |
| 4,751,539 | 6/1988 | Yamada et al. | 354/222 |
| 4,757,336 | 7/1988 | Nakayama et al. | 354/219 |
| 4,763,998 | 8/1988 | Tsuji et al. | 359/687 |
| 4,834,513 | 5/1989 | Nozawa | 350/427 |
| 4,842,395 | 6/1989 | Sato et al. | 350/423 X |
| 4,854,680 | 8/1989 | Kikuchi | 359/689 |
| 4,887,109 | 12/1989 | Fujita et al. | 350/423 X |
| 4,906,078 | 3/1990 | Inabara et al. | 350/427 X |
| 4,909,614 | 3/1990 | Itoh et al. | 350/423 |
| 4,941,012 | 7/1990 | Inabata | 354/478 |
| 4,945,372 | 7/1990 | Higuchi et al. | 354/199 |
| 4,969,723 | 11/1990 | Kate et al. | 354/221 |
| 4,992,809 | 2/1991 | Nozaki et al. | 354/222 |
| 5,034,764 | 7/1991 | Inabata | 354/223 |

FOREIGN PATENT DOCUMENTS

| 2647611 | 4/1978 | Fed. Rep. of Germany . |
| 3405789 | 8/1984 | Fed. Rep. of Germany . |
| 3707205 | 9/1988 | Fed. Rep. of Germany . |
| 3827480 | 2/1989 | Fed. Rep. of Germany . |
| 61-156018 | 7/1986 | Japan . |
| 61-156019 | 7/1986 | Japan . |
| 61-200523 | 9/1986 | Japan . |
| 63-37309 | 2/1988 | Japan . |
| 64-65519 | 3/1989 | Japan . |
| 1239933 | 5/1967 | Netherlands . |
| 365330 | 1/1932 | United Kingdom . |
| 521452 | 5/1940 | United Kingdom . |
| 538744 | 8/1941 | United Kingdom . |
| 206289 | 5/1981 | United Kingdom . |

OTHER PUBLICATIONS

Japanese Abstract of 60-78434; vol. 9, No. 217; p. 350-- Sep. 4, 1985.
Rudolf Kingslanke, "Development of the Zoom Lens", Aug. 1960, Journal of the SMPTE, vol. 69 pp. 534-544.
"Yashica Samurai X 0.3"-MFM Jun. 1988-236-1988.
French Search Report-FR 91064515-Sep. 2, 1991.
French Search Report-FR 8914178-Sep. 1, 1991.
"UV Stabilizers", Kirk-Othmer, Encyclopedia of Chemical Technology, vol. 23, Third Ed., 1983, pp. 615-627.

Primary Examiner—Scott J. Sugarman
Attorney, Agent, or Firm—Sughrue, Mion, Zinn, Macpeak & Seas

[57] ABSTRACT

A finder apparatus for use with a lens-shutter type camera composing a zoom imaging optical system, a zoom finder optical system separate from said zoom imaging optical system, and an electronic flash device. The zoom finder optical system is made as a real-image zoom finder apparatus, with part of the associated optical elements being disposed behind the electronic flash device, and part of the optical path from the objective lens to the eyepiece being bent backward of the electronic flash device to pass through the optical element disposed behind the electronic flash device.

9 Claims, 17 Drawing Sheets

ZOOM FINDER SYSTEM

This is a divisional of application Ser. No. 07/426,655 filed Oct. 26, 1989 now U.S. Pat. No. 4,992,809.

BACKGROUND OF THE INVENTION

The present invention relates to a lens-shutter type camera having a zoom imaging optical system, a finder optical system separate from said zoom imaging optical system, and an electronic flash defice, and specifically to a zoom finder for such a camera. More particularly, it relates to a zoom finder capable of effecting zooming with the eyesight through the finder being kept constant when it is used with a lens-shutter camera, a video camera or other types of cameras that are equipped with a zoom lens system.

The recent advance in technology for providing lens-shutter type cameras with a zooming capability has been remarkable, and versions having zoom ratios of 3 or more are presently available on the market. One of the problems that have occurred as a result of the efforts to increase the zoom ratio is how to insure the optical path length of the finder optical system. An albada finder which has been commonly used may be provided with a zooming capability, but this is difficult to accomplish if the zoom ratio exceeds a certain value. Although a real-image (Kepler type) finder seems to be the inevitable alternative, it requires a longer optical path than the albada finder because the real image of a subject formed with an objective lens must be inverted and reversed right and left by means of such elements as other lenses, a prism and a mirror for viewing after enlargement with an eyepiece system. This problem becomes substantial if a zooming capability is provided, because a longer optical path must be allowed for the movement of a zooming lens and since the length of the optical path increases with increasing zoom ratio.

Thus, a lens-shutter type camera that adopts a real-image zoom finder and which is designed to have a large zoom ratio is unable to insure the necessary optical path length with the traditional camera configuration, and this has given rise to the need for changing the configuration of the camera itself. In other words, it has become difficult to use the traditional camera configuration and design a real-image zoom finder having high zoom ratio.

On the other hand, cameras such as lens-shutter cameras and video cameras employ an imaging system and a finder system as mechanically separate components. If a zoom lens is to be used in the imaging system, it is desirable to employ a zoom finder the magnification of which varies in accordance with the degree of zooming and such a zoom finder is already available. Most of the zoom finders used today are classified either as reverse-Galilean finders of the type described in JP-A-53-63014 (the term "JP-A" as used herein means as "unexamined published Japanese patent application) or as real-image finders of the type described in JP-A-61-156018.

A reverse-Galilean finder is so designed as to view a virtual image formed with an objective lens, but it involves difficulty in increasing the finder magnification and zoom ratio. In addition, it suffers from the problem of an unclear finder frame. To avoid these problems, the use of a real-image finder capable of viewing a real image is desirable. However, a real-image finder has such a construction that its overall length will increase inevitably. The zoom finder described in JP-A-61-156018 is so designed that the first lens group has a negative power but the finder magnification must be reduced in order to shorten the overall length, or the zoom ratio cannot be increased without causing increased variations in the overall length upon zooming.

Recent versions of lens-shutter cameras and video cameras are characterized by the increasing use of zoom lenses with high zoom ratio in the imaging system but on the other hand, the size of camera body itself is becoming smaller. Thus, it is desired to install in these cameras a zoo finder that is compact and which is so constructed that a high zoom ratio can be easily attained without experiencing any substantial aberrational variations upon zooming.

OBJECTS AND SUMMARY OF THE INVENTION

An object, therefore, of the present invention is to provide a lens-shutter type camera that uses a real-image zoom finder and which yet permits the adoption of the traditional camera configuration even if it is designed to feature a zoom ratio of 3 or more.

The present inventors noted the fact that an electronic flash device typically built in cameras has the light-emitting section located on the front face of the camera, thus leaving a space unoccupied in the area behind it. The present invention has been accomplished on the basis of the idea of utilizing this empty space for the optical path of a real-image zoom finder apparatus.

The finder apparatus of the present invention is generally intended to be used with a lens-shutter type camera having a zoom imaging optical system, a zoom finder optical system separate from this zoom imaging optical system, and an electronic flash device. In one aspect of the present invention, said zoom finder optical system is made as a real-image zoom finder apparatus and part of the associated optical elements is disposed behind the electronic flash device, with part of the optical path from the objective lens to the eyepiece being bent backward of the electronic flash device to pass through said optical element disposed behind the electronic flash device.

In another and specific aspect the objective lens in said real-image zoom finder apparatus is disposed adjacent the electronic flash device and part of the optical elements of said finder is disposed behind the electronic flash device, with the optical path in said finder apparatus being composed of an entrance path from the objective lens to a first reflecting element, a refraction path from said first reflecting element to said optical element disposed behind th electronic flash device, and an exit path from said optical element to the eyepiece disposed behind it.

The zooming lens group is desirably disposed in the entrance path since it can be made to have a sufficient path length.

If desired, the optical element disposed behind the electronic flash device may be a resin molded article having a lens formed integral with a prism that reflects rays of light toward the eyepiece. This arrangement is effective for space saving.

Further, this prism integral with the lens may have a second reflecting face for reflecting the rays of light from the refraction path downward, a third reflecting face for reflecting the rays of reflected light from said second reflecting face in a direction parallel to said refraction path, and a fourth reflecting face for reflecting the rays of reflected light from said third reflecting face to travel along said exit path. This embodiment is effective for achieving a further increase in the optical path length.

Another object of the invention is to provide a real-image zoom finder that is compact, that is capable of attaining a high zoom ratio of 2.5-3.5 without experiencing any substantial variations in aberrations and overall length upon zooming, and that has a sufficient finder magnification to produce an impressive image by viewing through the finder.

The zoom finder of the present invention consists basically of an objective optical system having a positive overall power and an eyepiece optical system having a positive overall power, which objective optical system comprises, in order from the object side, a first lens group having a positive power, a second lens group having a negative power, a third lens group having a positive power and a fourth lens group having a weak power. The image formed by said objective optical system is focused in the neighborhood of the first surface of said eyepiece optical system, and said second and third lens groups or said first to third lens groups are moved to effect zooming with the eyesight through the finder being held constant.

In the zoom finder having the construction described above, the objective optical system desirably satisfies conditions (1) –(3) set forth below, and it is also desirable for the eyepiece optical system to satisfy condition (4) to be set forth below:

$$0.4 < N_2 < 0.9 \quad (1)$$

$$|100/f_4| < 3.0 \quad (2)$$

$$2.2 < f_1/f_s < 3.5 \quad (3)$$

$$0.375 < r_{e1}/f_e < 0.6 \quad (4)$$

where $N_2$: the zoom ratio of the second lens group as compared to the zoom ratio of the objective optical system;

$f_i$: the focal length of the ith lens group;

$f_s$: the focal length of the objective optical system at wide-angle end;

$f_e$: the focal length of the eyepiece optical system; and $r_{e1}$: the radius of curvature of the first surface of the eyepiece optical system.

According to another aspect of the invention there is provided a zoom finder comprising an objective optical system having a positive overall power and an eyepiece optical system having a positive overall power, said objective optical system comprising, in order from the object side, a first lens group having a positive power, a second lens group having a negative power, and a third lens group having a positive power, the image formed by said objective optical system being focused in the neighborhood of the first surface of said eyepiece optical system, said second and third lens groups being moved to effect zooming with the eyesight through the finder being held constant.

In this zoom finder, the objective optical system satisfies at least the following conditions (1) and (3):

$$0.4 < N_2 < 0.9$$

$$2.2 < f_1/f_s < 3.5$$

DESCRIPTION OF THE PREFERRED EMBODIMENTS

Figure 1:
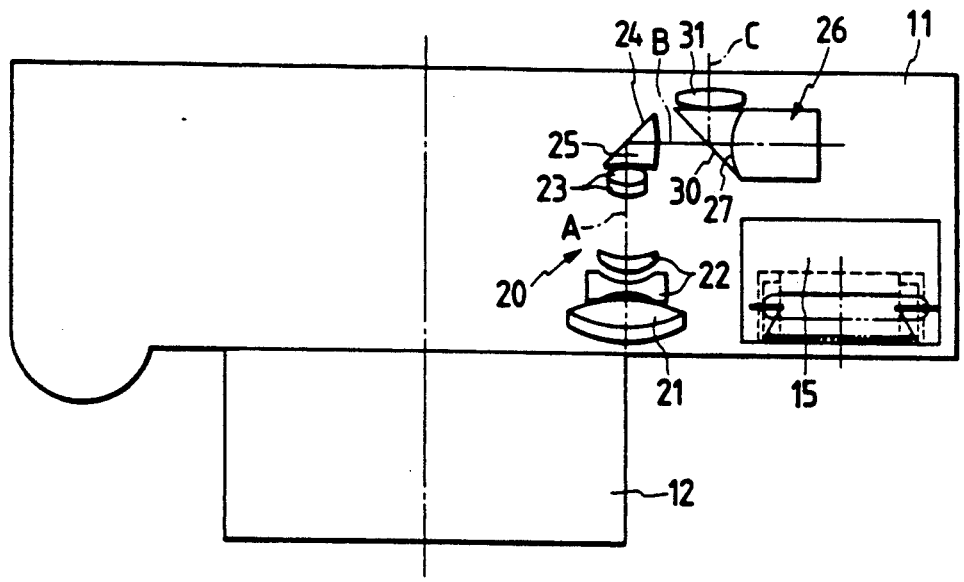
FIG. 1 is a plan view of a lens-shutter camera using the finder apparatus of the present invention.
Figure 2:
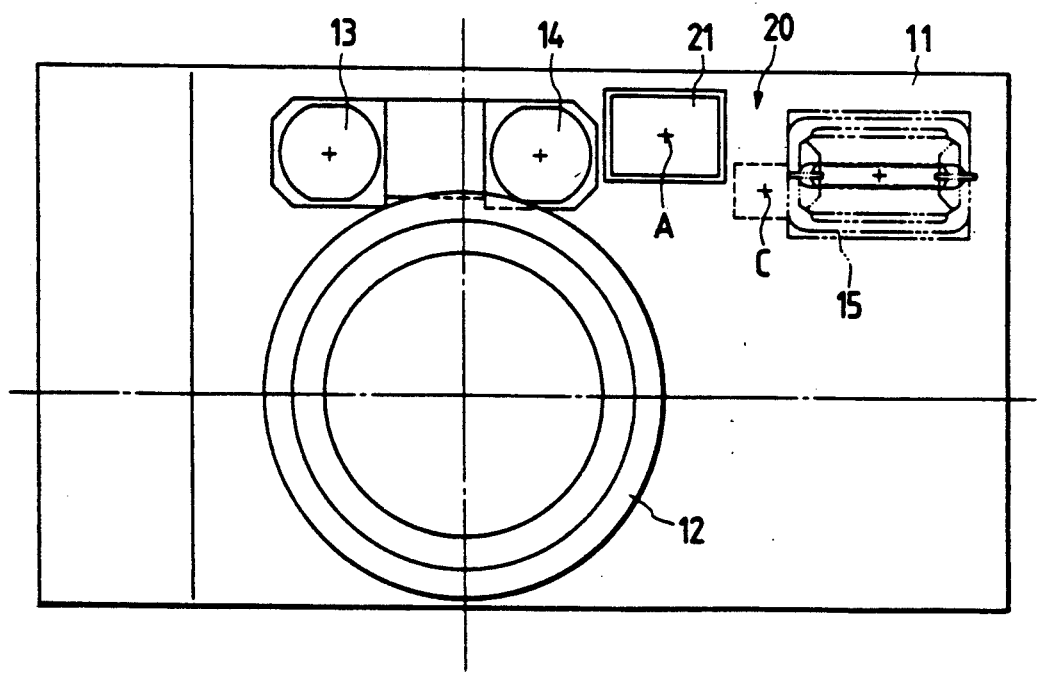
FIG. 2 is a front view of the same camera.
Figure 3:
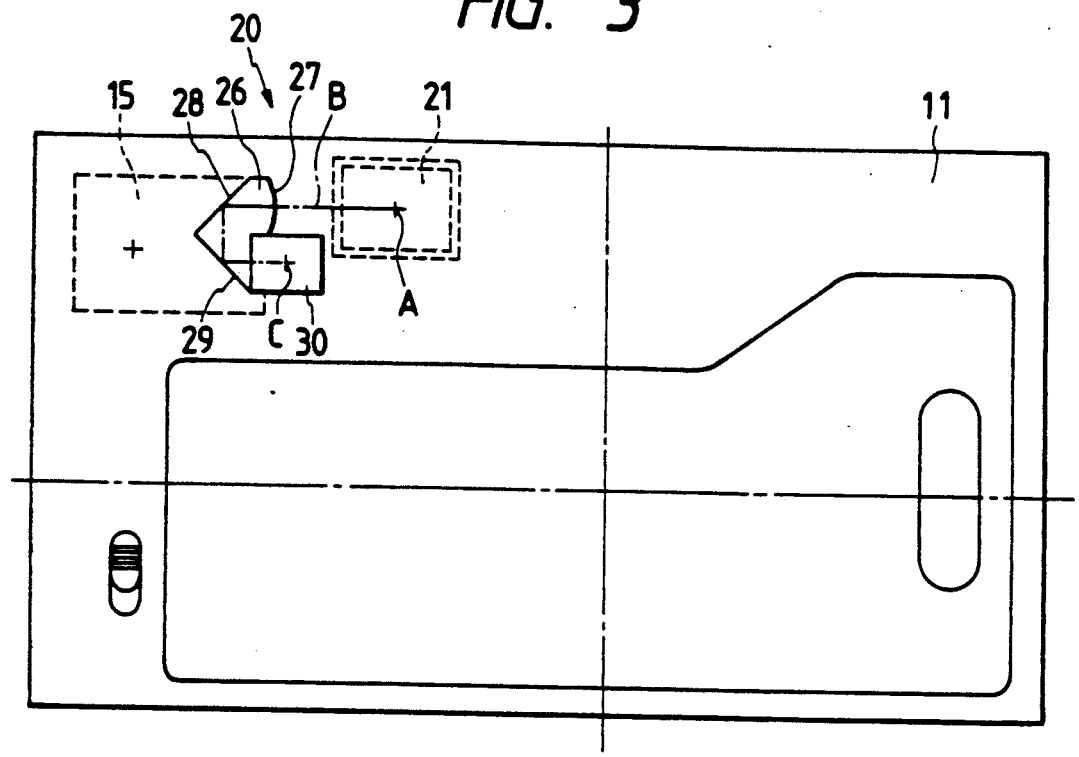
FIG. 3 is a rear view of the same camera.
Figure 4:
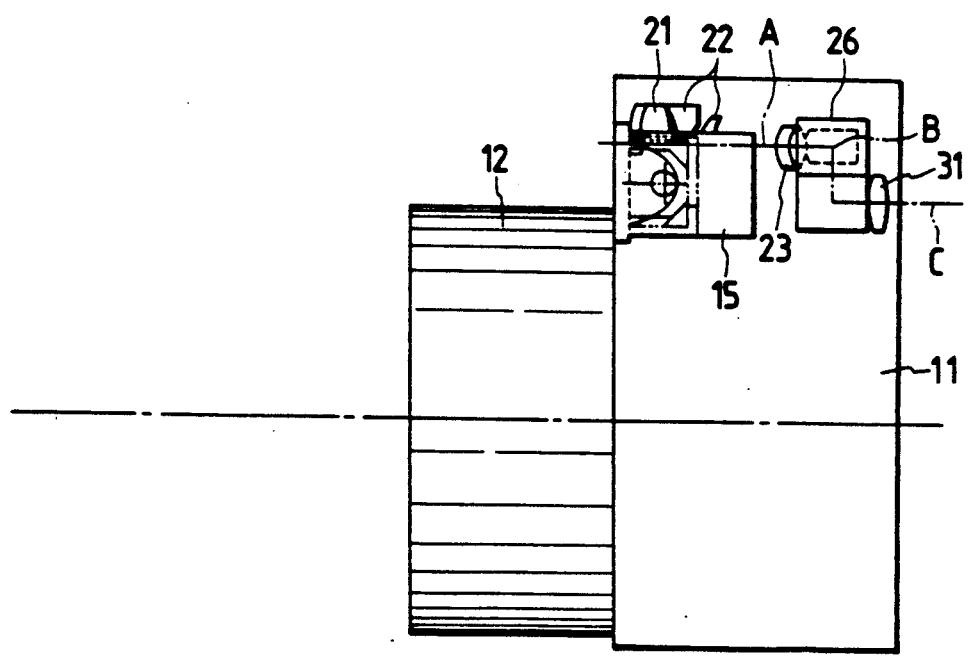
FIG. 4 is a side view of the same camera.

The present invention is described hereinafter with reference to the accompanying drawings.

FIGS. 1-4 show the general appearance of a lens-shutter type camera having a real-image zoom finder apparatus 20 constructed in accordance with the present invention. The camera body indicated by 11 has a zoom imaging lens 12 in its generally central portion, and the light-emitting portion 13 and light-receiving portion 14 of a range-finding meter are disposed on the left and right sides above the zoom imaging lens 12. The camera body 11 also has a zoom electronic flash device 15 in the upper right portion as seen looking into its front face.

The real-image zoom finder apparatus which is the characteristic feature of the present invention is disposed in the space left available in part of the area behind the zoom electronic flash device 15. The objective lens 21 in the real-image zoom finder apparatus 15 is disposed inward and adjacent to this flash device 15. Zooming lens groups 22 and 23 and a prism 25 having a first reflecting face 24 are located in the entrance path A along the optical path of the objective lens 21. The first reflecting face 24 of the prism 25 deflects the entrance path A by 90 degrees to form a refraction path B.

Behind the flash device 15, a prism 26 integral with a lens, both being made of resin molding, is disposed on the refraction path B. This prism 26 has a lens surface 27, a second reflecting face 28, a third reflecting face 29 and a fourth reflecting face 30. The second reflecting face 28 reflects the rays from refraction path B downward; the third reflecting face 29 reflects the rays of reflected light from face 28 in a direction parallel to refraction path B; and the fourth reflecting face 30 reflects the rays of reflected light from face 29 to travel along the exit path C which is parallel to the entrance path A. An eyepiece 31 is located on the exit path C.

The image of a subject formed by the combination of objective lens 21 with zooming lens groups 22 and 23 is focused on the lens surface 27 and inverted and reversed right and left by means of the second reflecting face 28, third reflecting face 29 and fourth reflecting face 30 for viewing through the eyepiece 31. The finder frame is depicted on the lens surface 27.

As described above, the real-image zoom finder apparatus 20 of the present invention is so designed that its optical path is routed behind the zoom electronic flash device 15 and this enables the necessary optical path length to be insured without designing the camera body 11 to have a special configuration as in the prior art. Further, the zooming lens groups 22 and 23 are disposed in the entrance path A that can be made fairly longer than the other optical paths and this is effective in attaining a high zoom ratio, say 3 or more.

Figure 5:
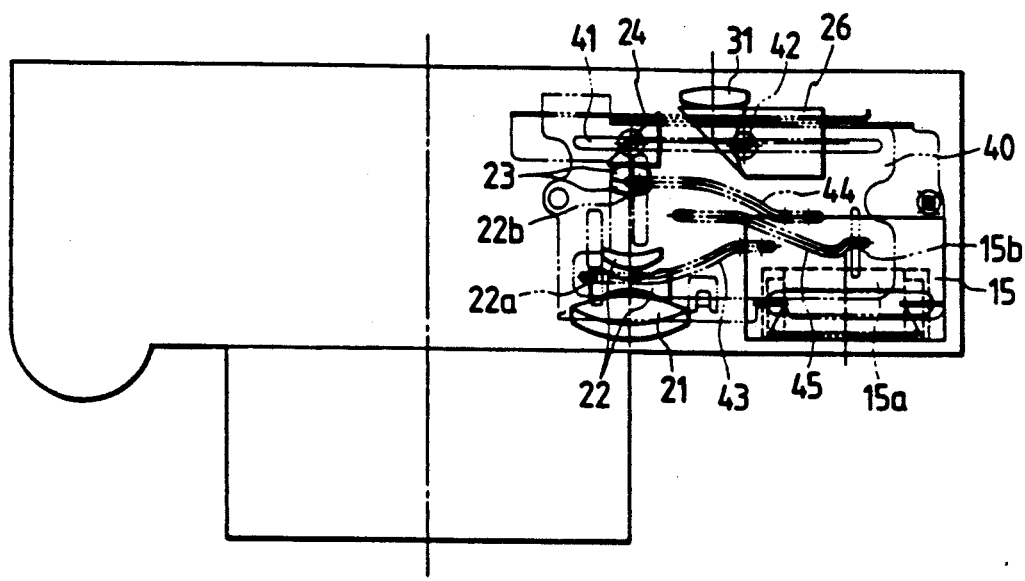
FIG. 5 is a plan view showing an example of the mechanism for driving the zoom finder apparatus and electronic flash device shown in FIGS. 1-4.
Figure 6:
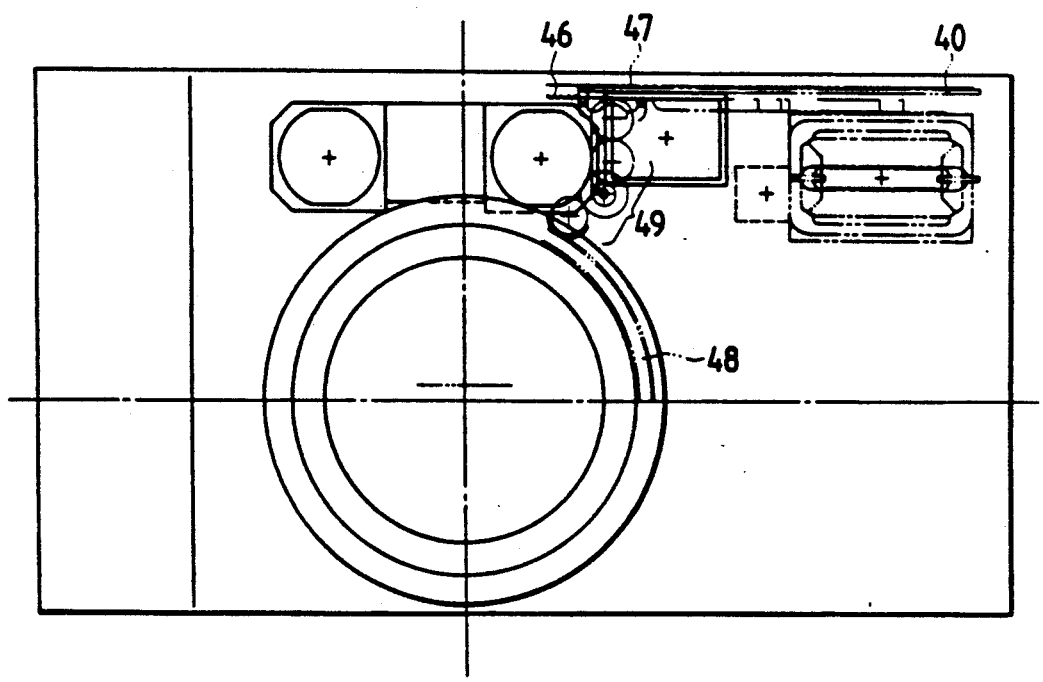
FIG. 6 is a front view of said mechanism.
Figure 7:
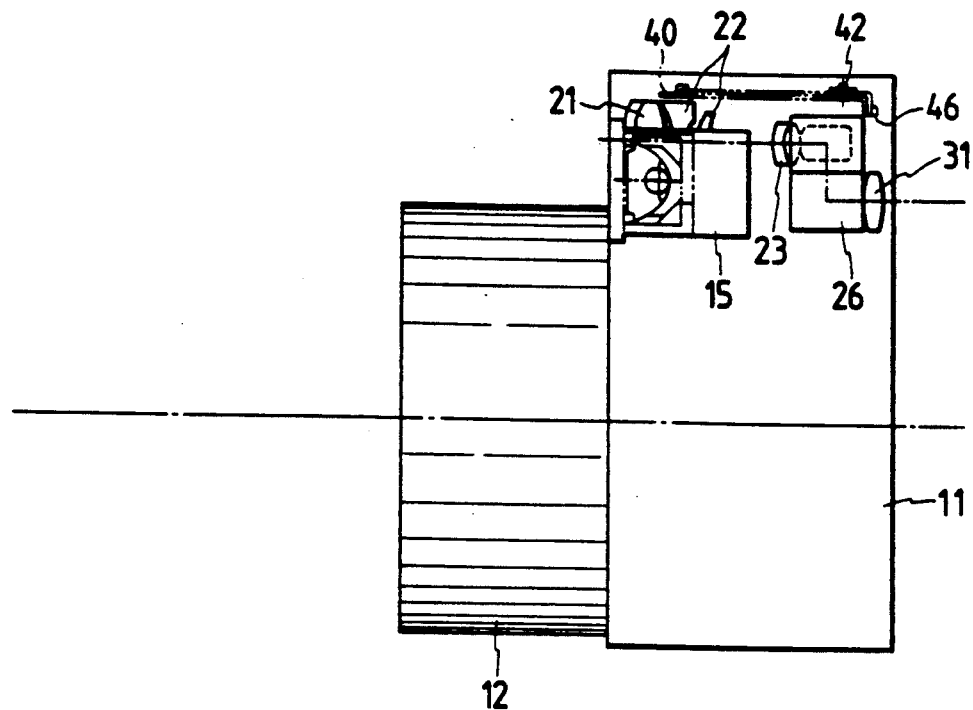
FIG. 7 is a side view of said mechanism.

The mechanism for driving the zooming lens groups 22 and 23 is described below with reference to FIGS. 5–7. On top of the zoom electronic flash device 15 and real-image zoom finder apparatus 20, a place cam plate 40 is disposed in such a way that it is movable laterally by means of a guide groove 41 and a guide pin 42. This plane cam plate 40 has formed therein cam grooves 43, 44 and 45 through which are respectively inserted a pin 22a fixed to the support frame of the zooming lens group 22, a pin 22b fixed to the support frame of the zooming lens group 23 and a pin 15b fixed to the movable light-emitting unit 15a of the electronic flash device 15. The movable light-emitting unit 15a consists of a unitary assembly of a xenon flash tube 15c and a reflector. The angle of illumination with the electronic flash will change if the unit 15a moves toward or away from the subject to the imaged.

The plane cam plate 40 has a rack 46 formed at its rear end and a pinion 47 that meshes with this rack 46 is rotationally driven via a gear 48 fixed to the cam ring on the zoom imaging lens 12 and a gear train 49 in mesh with this gear 48. The cam ring on the zoom imaging lens 12 is rotationally driven to effect zooming with said lens. Thus, the plane cam plate 40 will move from right to left or vice versa when zooming is effected with the lens 12, and the zooming lens groups 22 and 23 are moved in the direction of the optical axis as guided by cam grooves 43 and 44 so as to insure that the scene to be imaged will coincide with the visual field of finder. Further, the angle of illumination with the electronic flash is varied in accordance with the viewing angle by moving the light-emitting unit 15a as guided by the cam groove 45.

The foregoing description assumes that the present invention is applied to a silver salt photographic camera but it should be understood that the present invention is also applicable to a video still camera.

As described on the foregoing pages, the finder apparatus of the present invention for use with a lens-shutter type camera makes use of the space in the area behind a commonly employed electronic flash device in such a way that the optical path is routed in that area to insure the necessary optical path length. This enables the construction of a real-image zoom finder apparatus having high zoom ratio without increasing the overall thickness of the camera body. Consequently, a lens-shutter type camera having high zoom ratio can be produced using the traditional and hence easy-to-handle camera configuration.

If the zooming lens groups are disposed in the entrance optical path which can be made longer than other paths, the zoom finder apparatus can be constructed in an easy way. If the optical element to be disposed behind the electronic flash device is formed of a resin molded article in which a lens is made integral with a prism, the added advantage of space saving can be attained. The lens and the prism may be integrated and this unitary assembly of lens and prism is also effective in increasing the optical path length.

The optical system layout of the present invention which is applicable to the foregoing zoom finder is described hereinafter with reference to FIG. 8 which shows Example 1 of the present invention.

Figure 8:
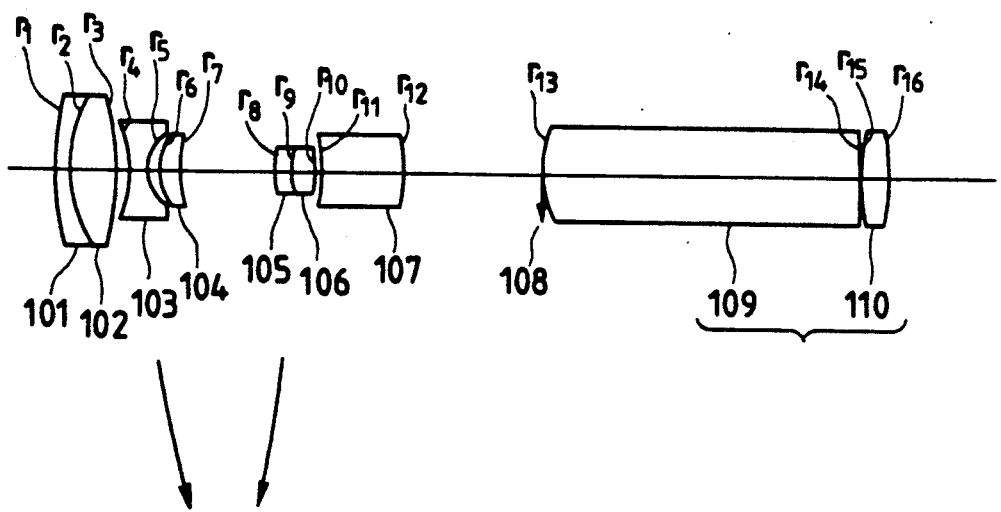
FIGS. 8, 11, 14, 17, 20, 23, 26, 29 and 32 are schematic cross-sectional views of finder apparatus constructed according to Examples 1-9, respectively, of the present invention.
Figure 9:
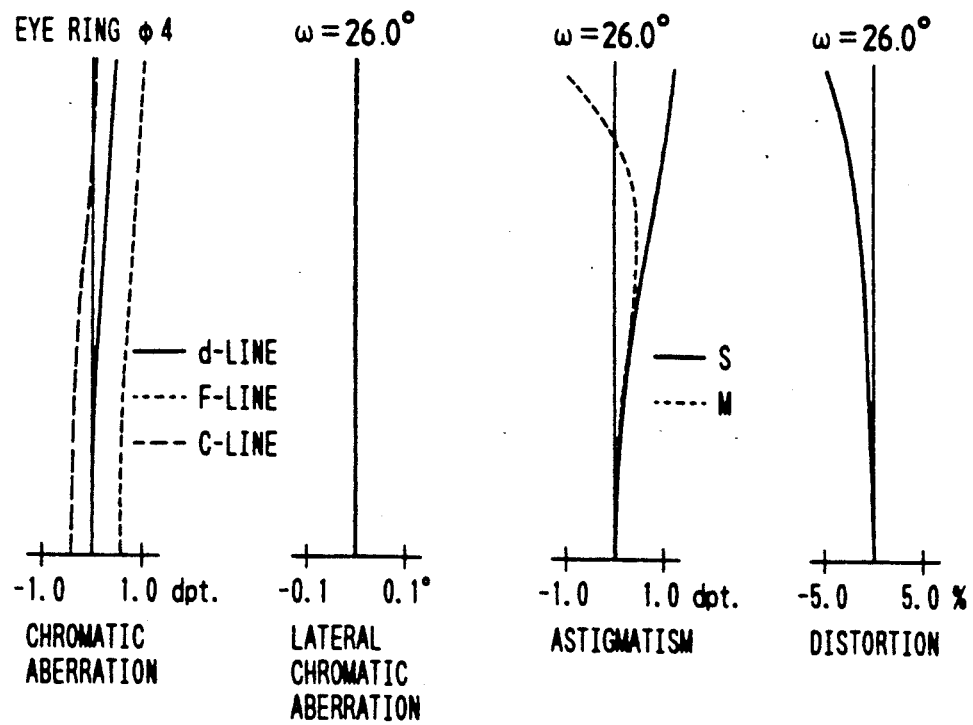
FIGS. 9, 12, 15, 18, 21, 24, 27, 30 and 33 plotting the aberration curves obtained at the wide-angle end with the finder apparatus constructed according to Examples 1-9, respectively.
Figure 10:
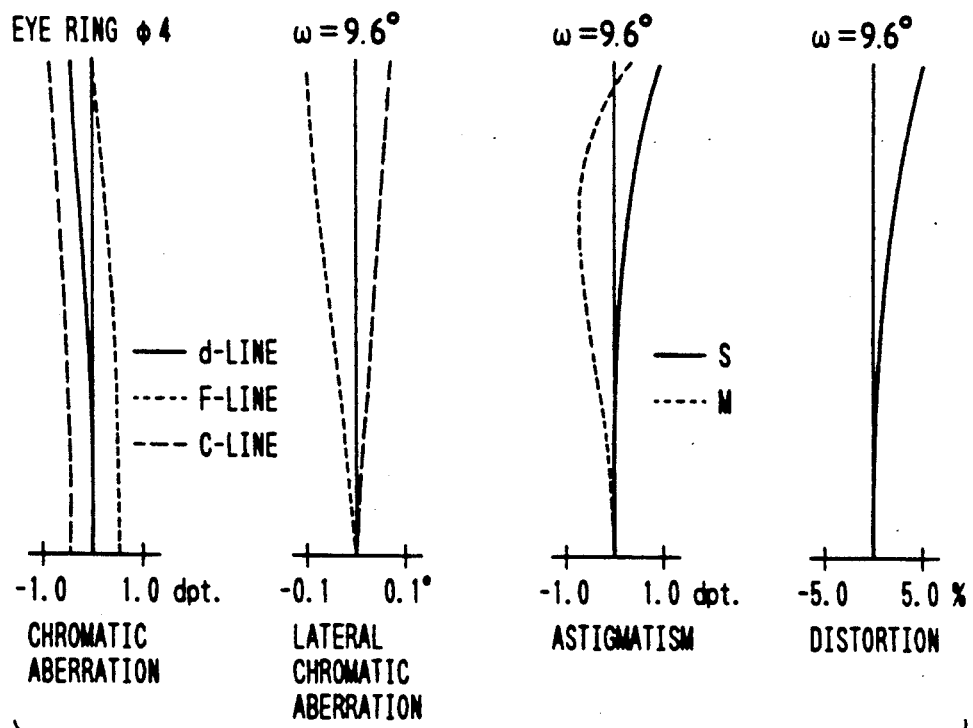
FIGS. 10, 13, 16, 19, 22, 25, 28, 31, 34 are graphs plotting the aberration curves obtained at the telephoto end with the finder apparatus constructed according to Examples 1-9, respectively.
Figure 11:
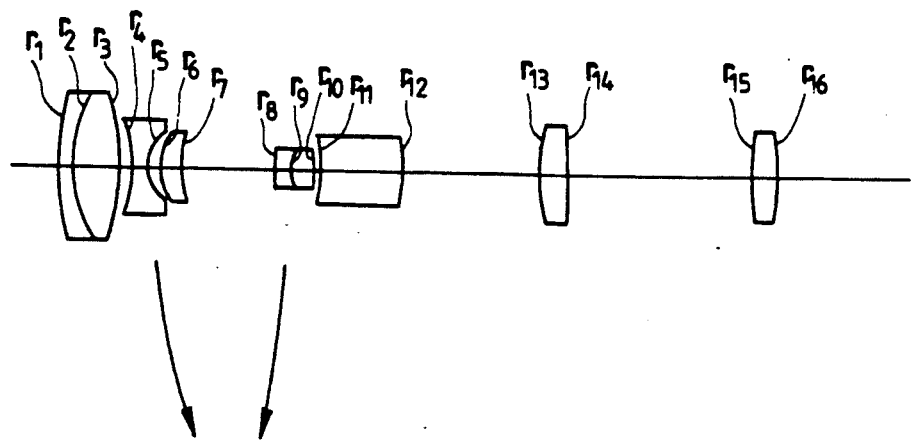
Figure 12:
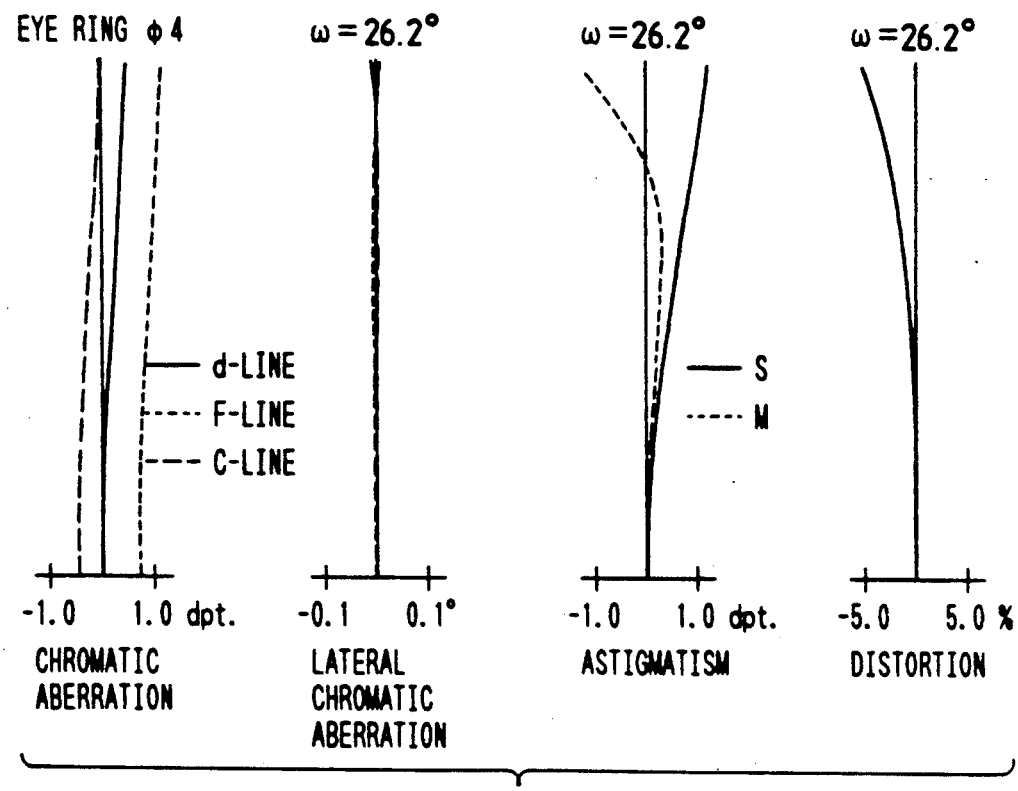
Figure 13:
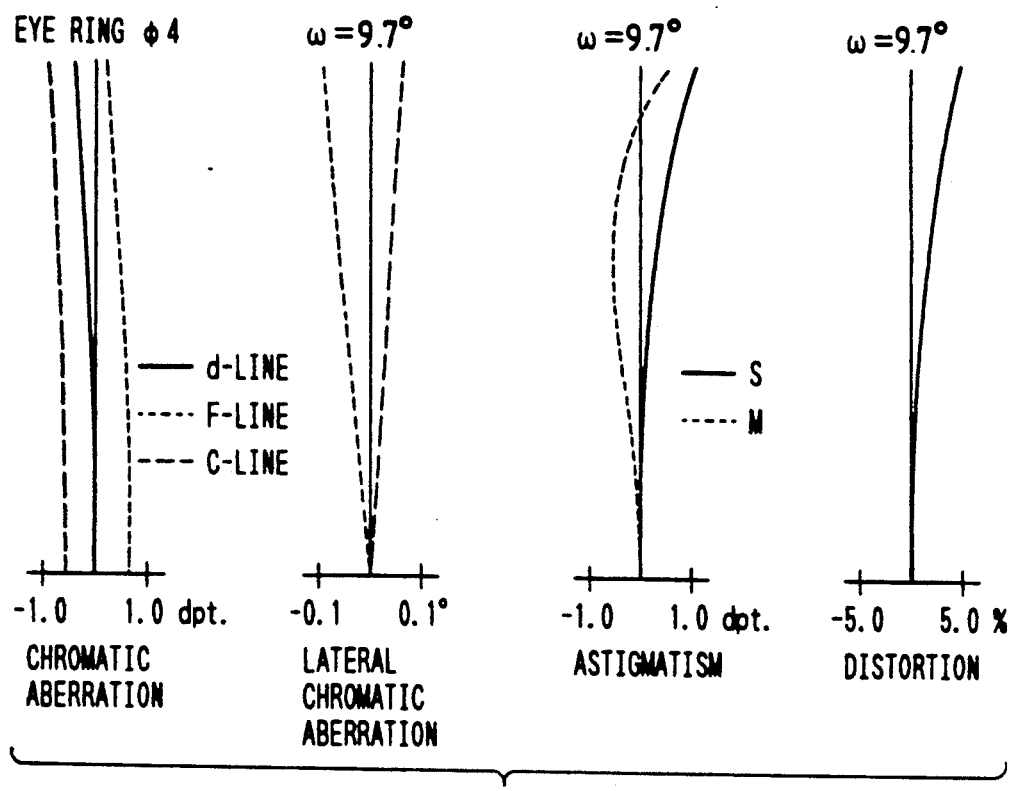
Figure 14:
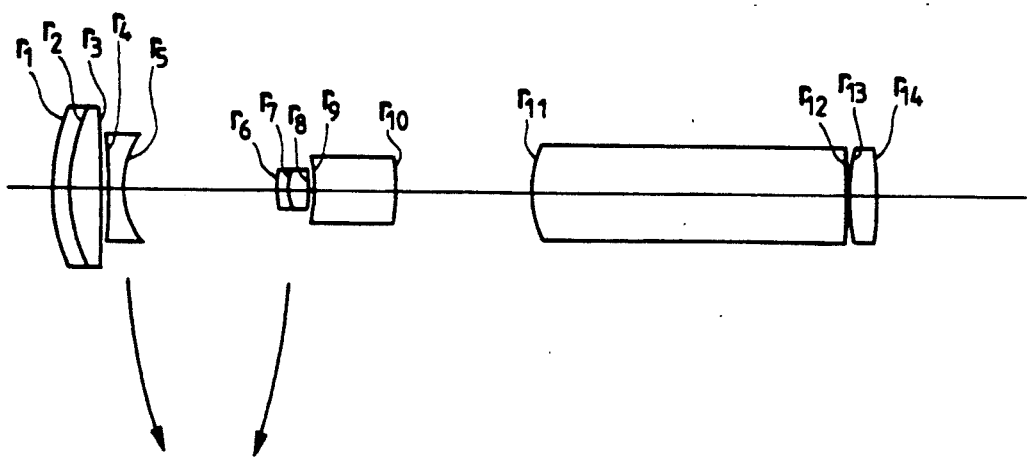
Figure 15:
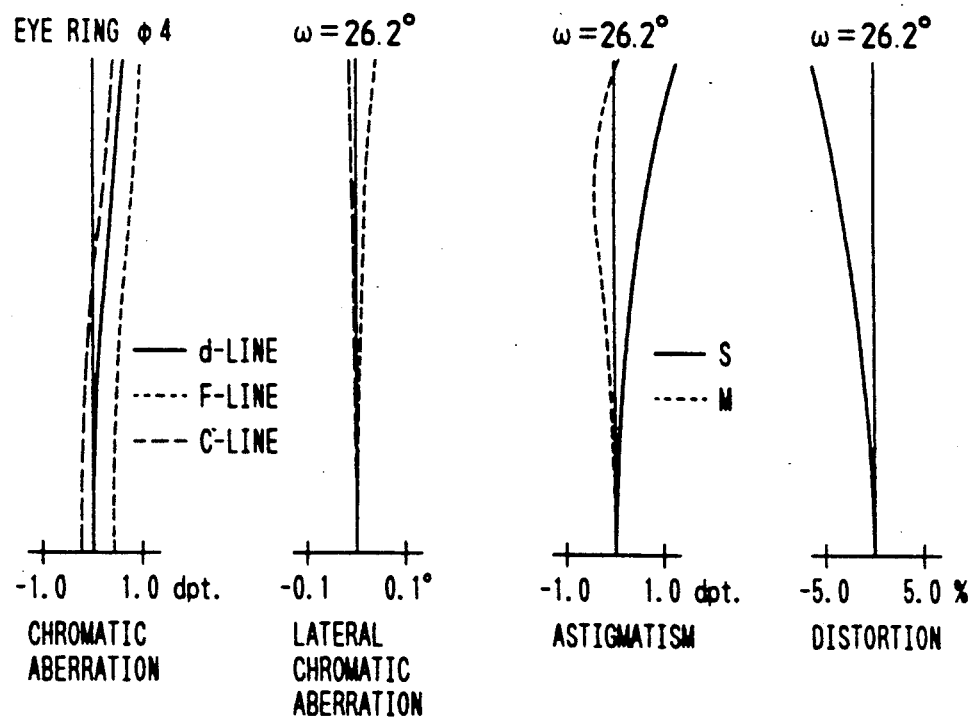
Figure 16:
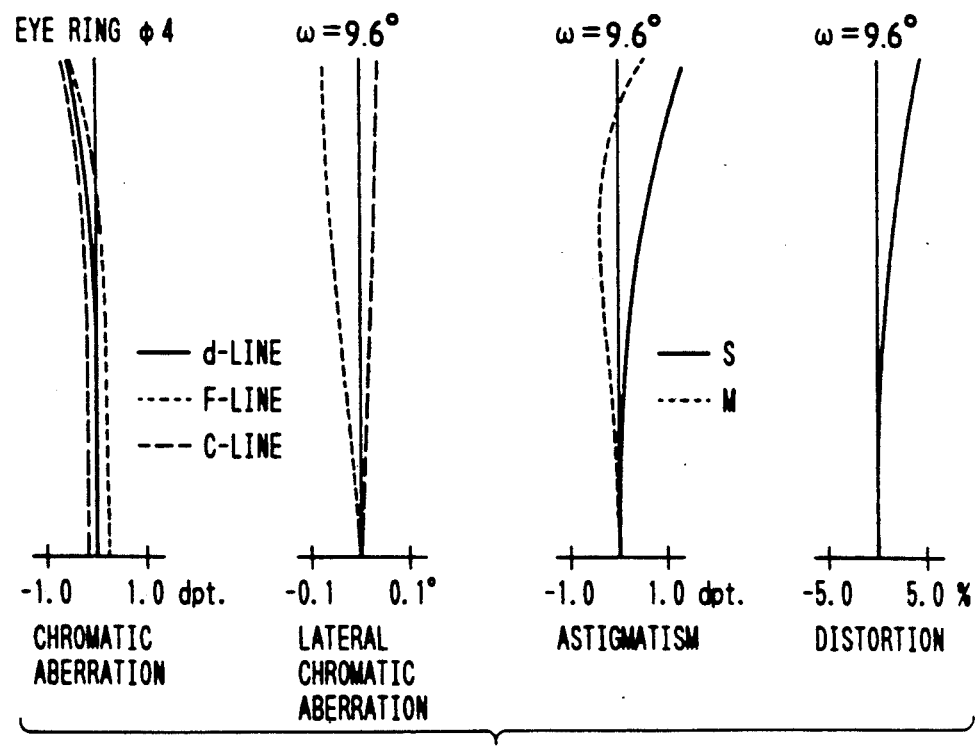
Figure 17:
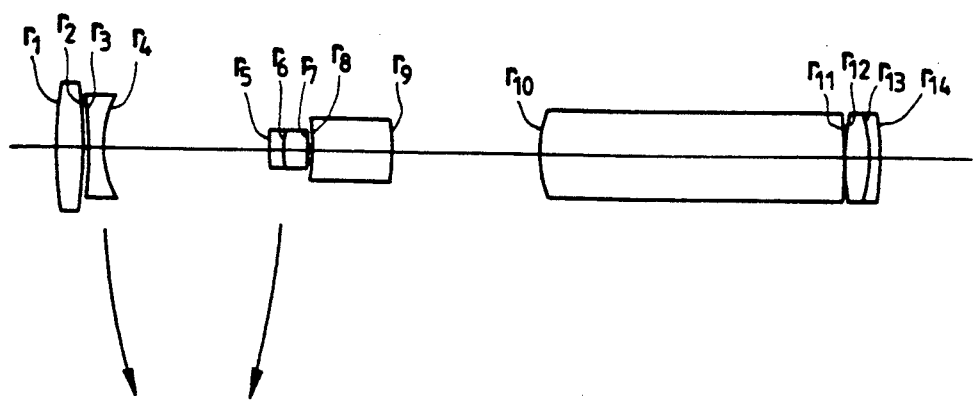
Figure 18:
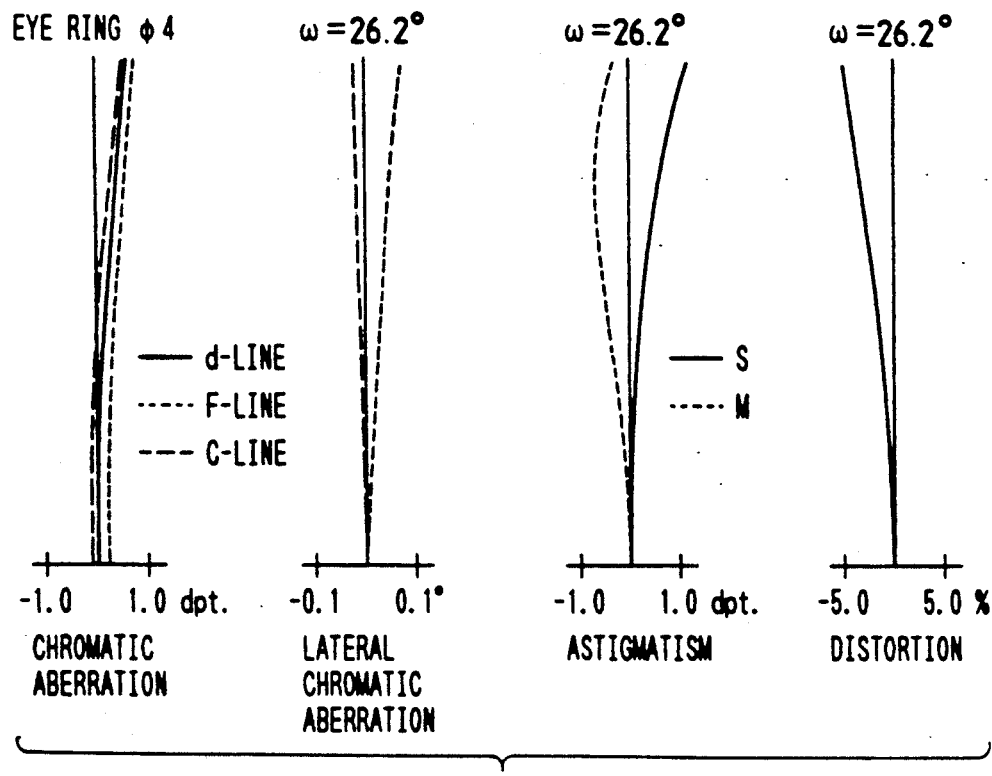
Figure 19:
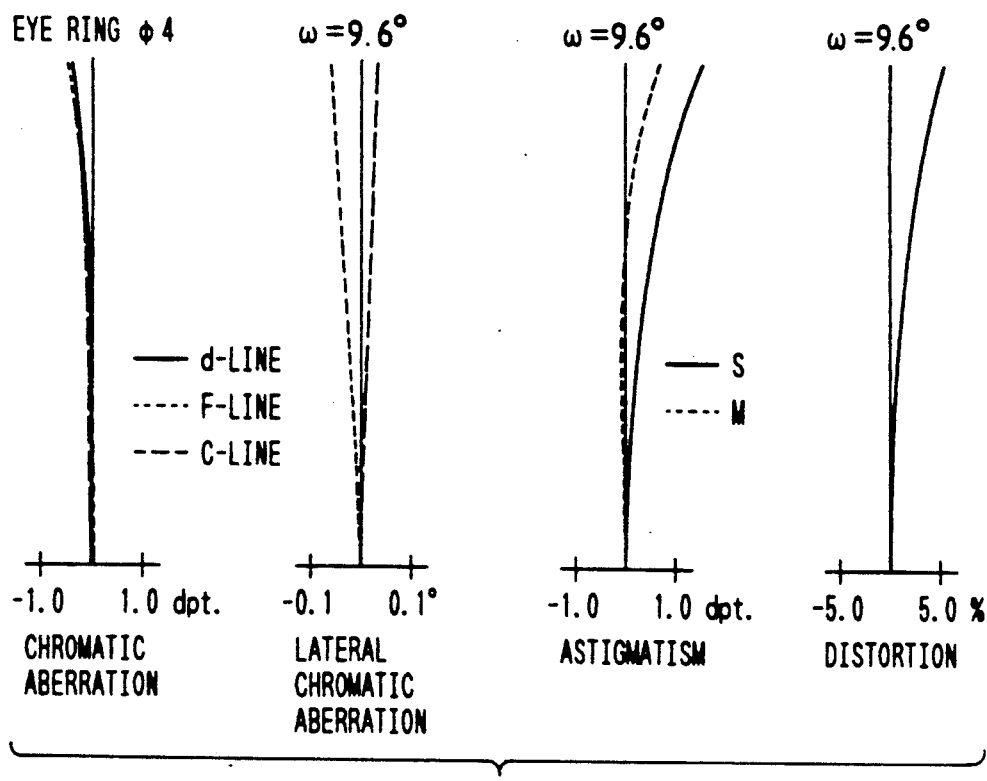
Figure 20:
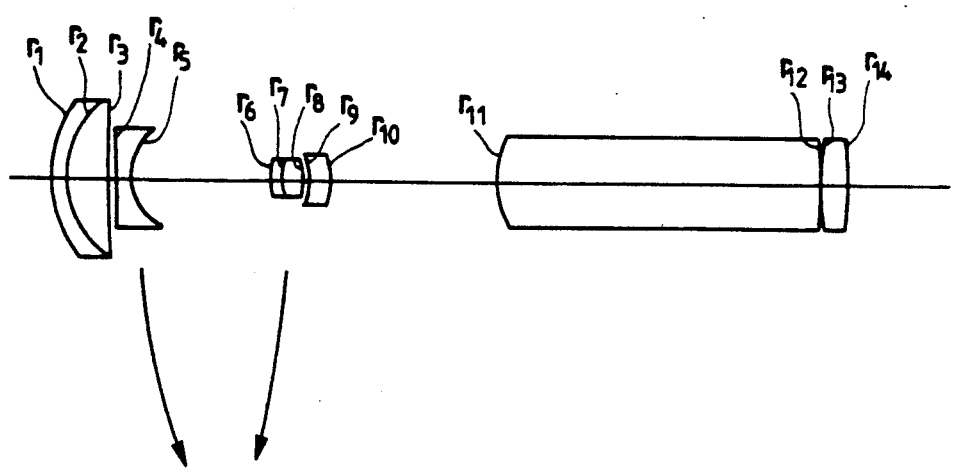
Figure 21:
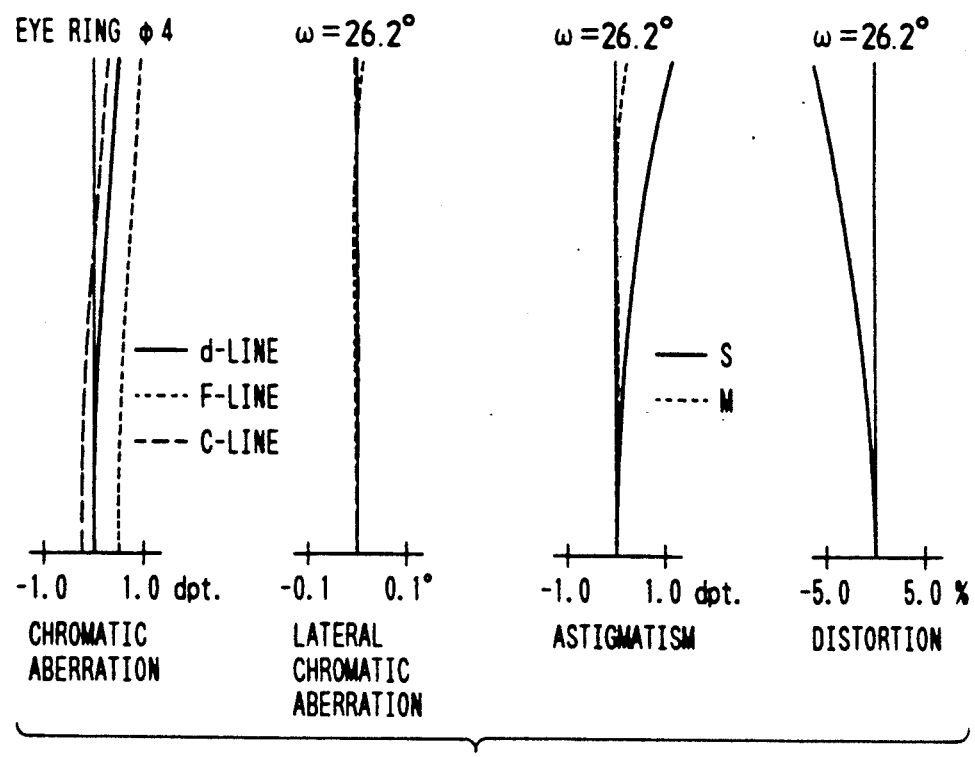
Figure 22:
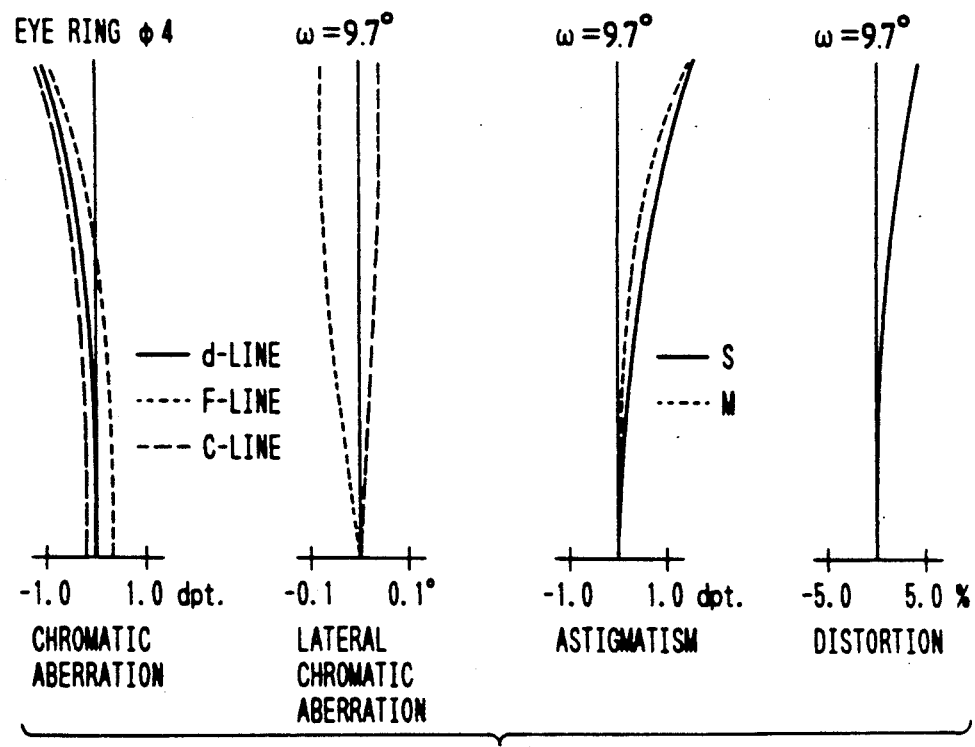

In FIG. 8, numerals 101 to 107 denote lens groups that make up an objective optical system having a positive overall power; 101 and 102 are lenses that form a first lens group having a positive power, 103 and 104 are lenses that form a second lens group having a negative power, 105 and 106 are lenses that form a third lens group having a positive power, and 107 is a fourth lens group having a weak power. Shown by 108 is an image formed by the objective optical system and which is focused in the neighborhood of the first surface of the eyepiece optical system. Numerals 109 and 110 collectively refer to the eyepiece optical system having a positive overall power. In the example shown in FIG. 8, a Porro prism 109 is used to erect the image 108 formed by the objective optical system. For the sake of simplicity, the Porro prism 109 is shown as a flattened glass block.

The optical layouts shown in FIGS. 11, 14, 17, 20, 23 and 26 need not be described in detail since one will readily understand them in the light of the above explanation of the layout shown in FIG. 8.

Figure 23:
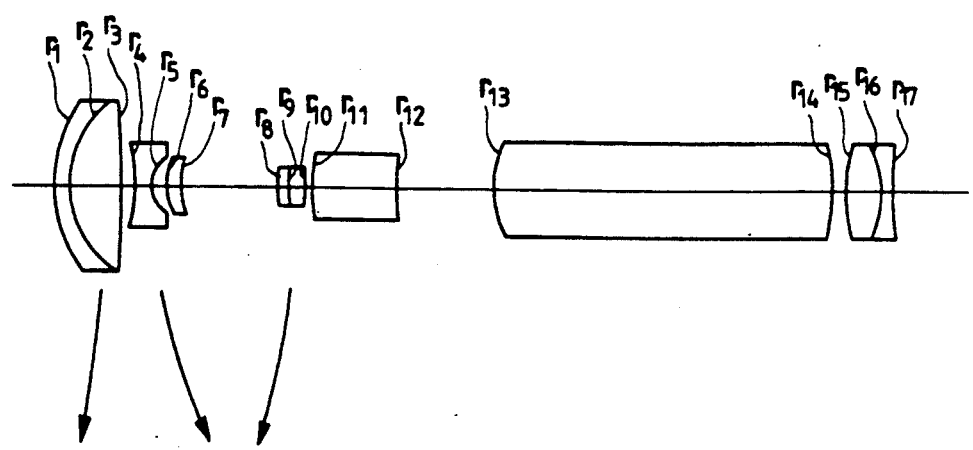
Figure 24:
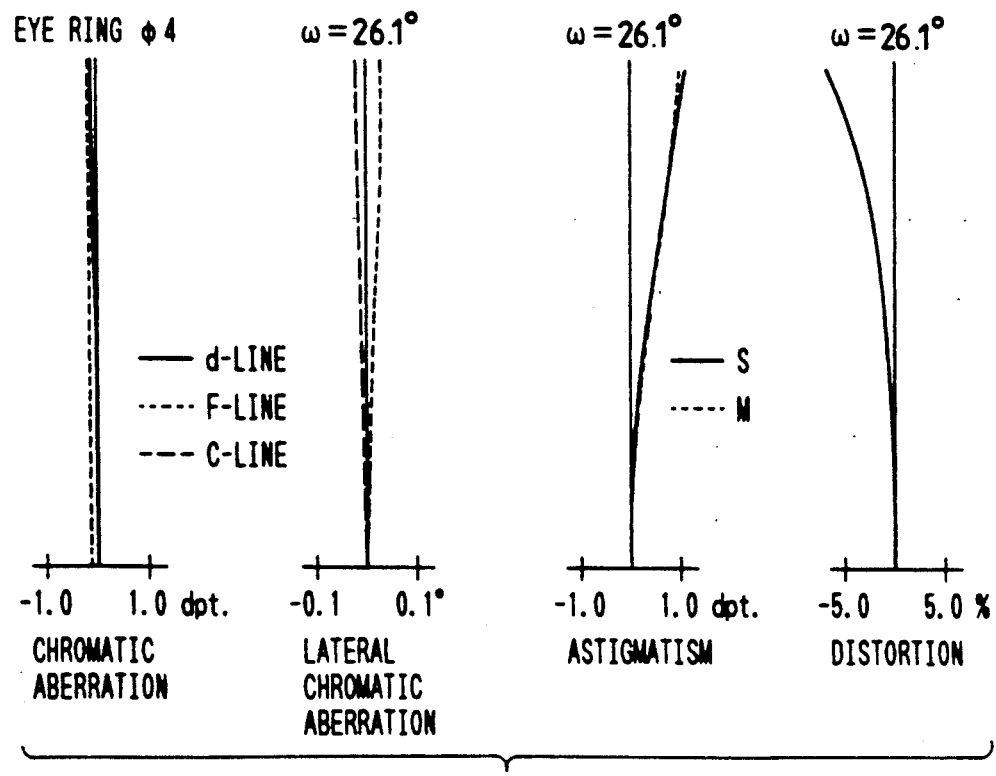
Figure 25:
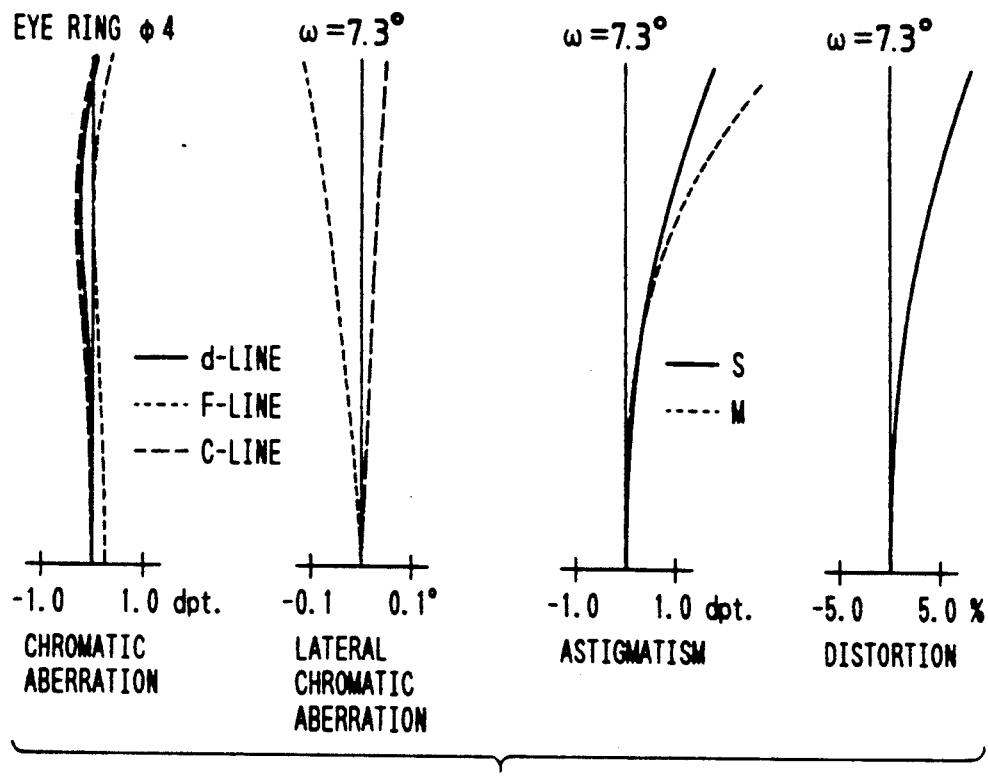
Figure 26:
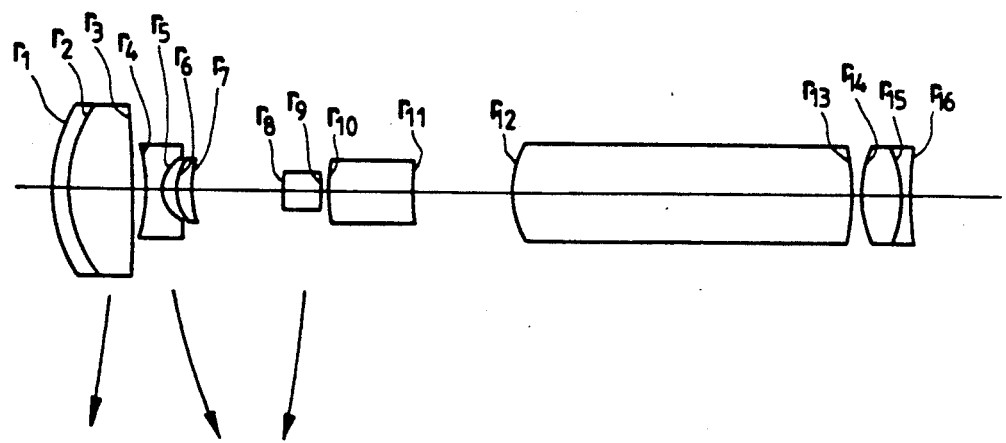
Figure 27:
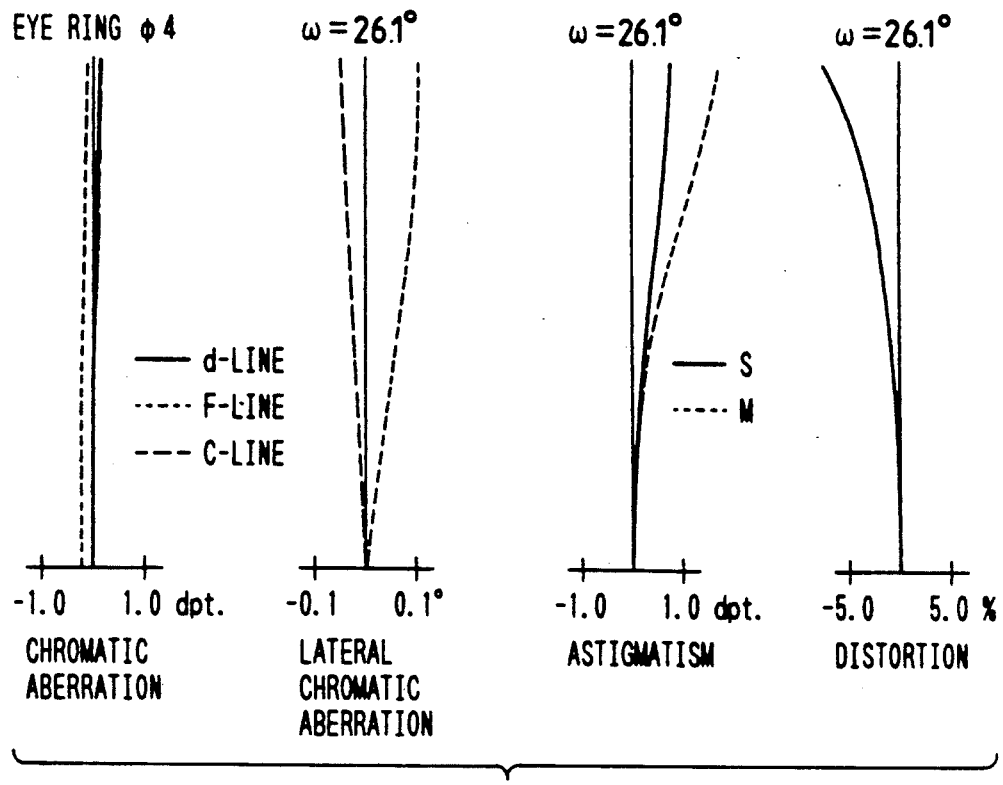
Figure 28:
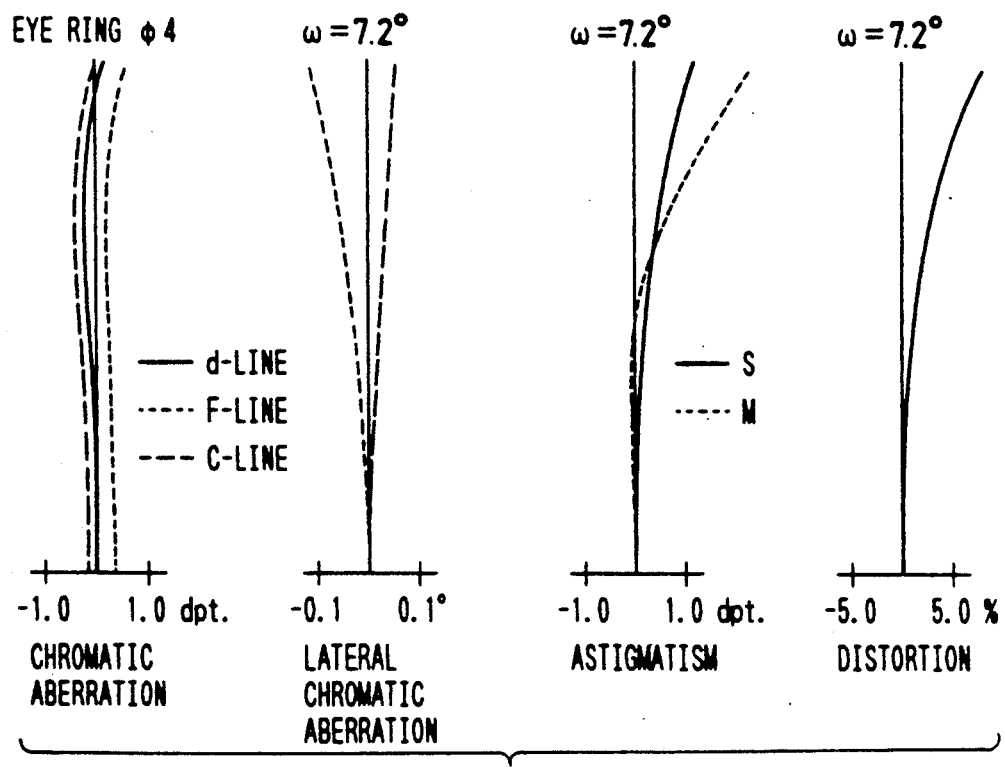
Figure 29:
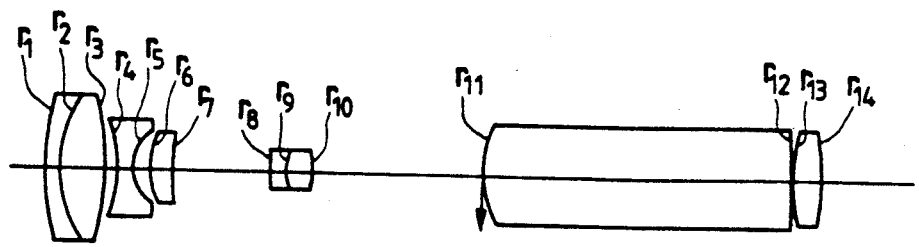
Figure 29:
Figure 30:
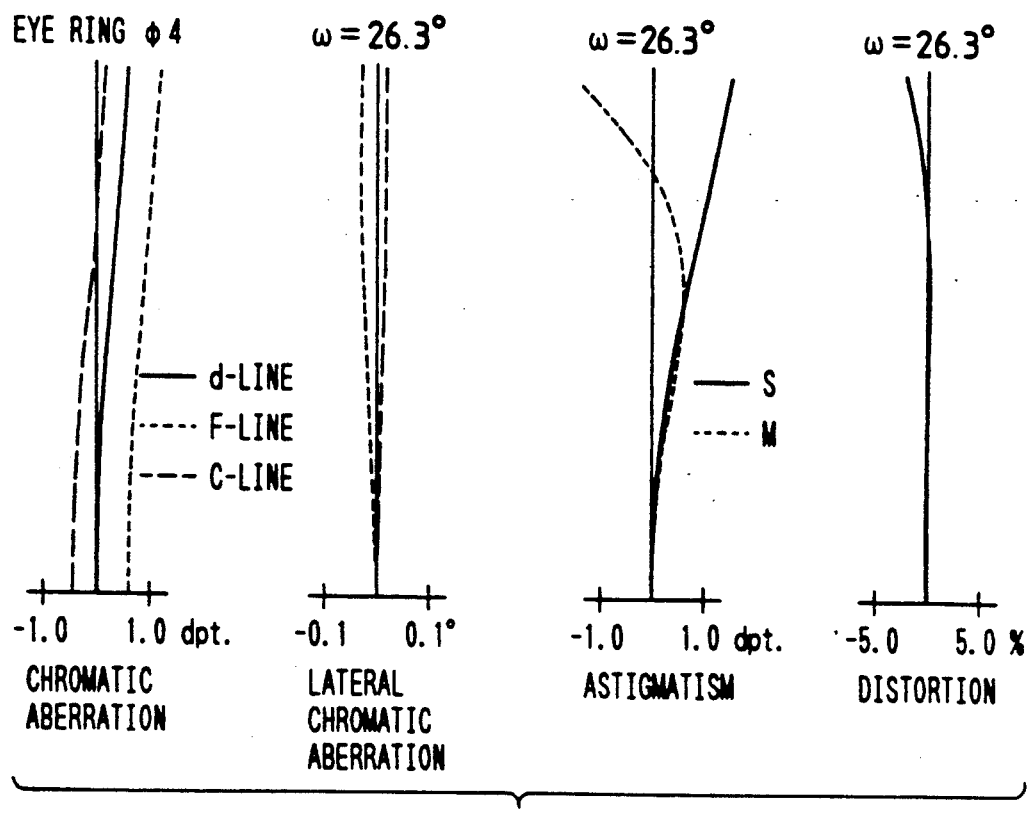
Figure 31:
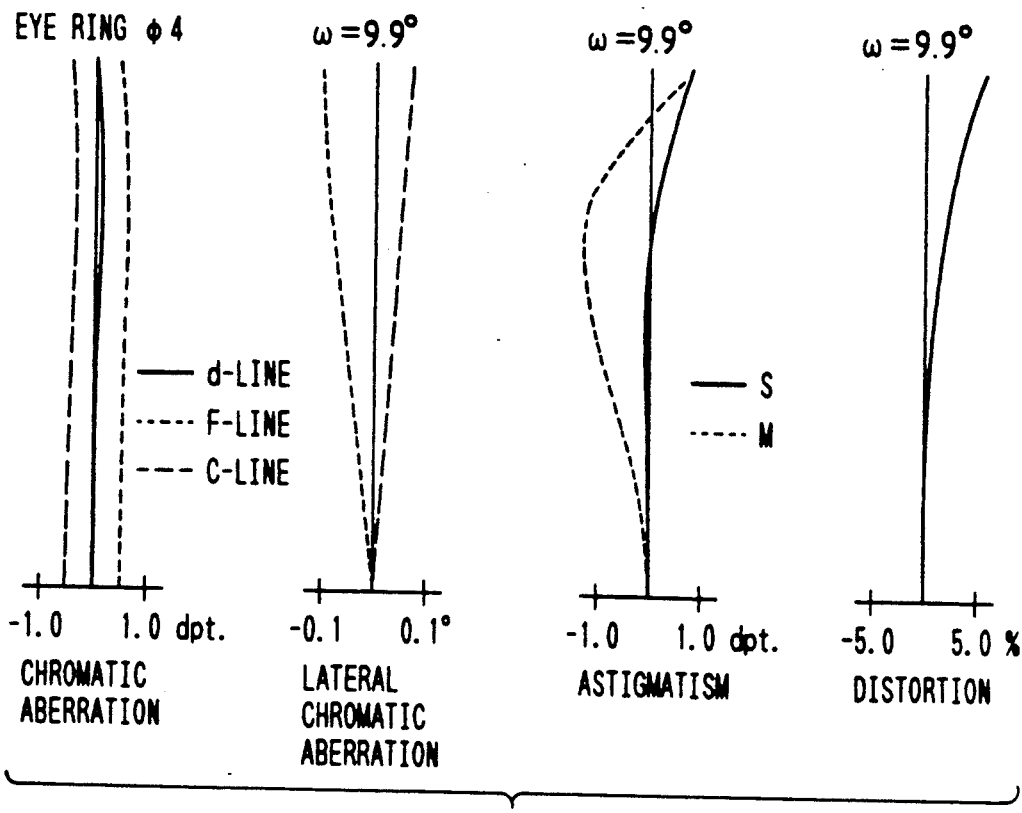
Figure 32:
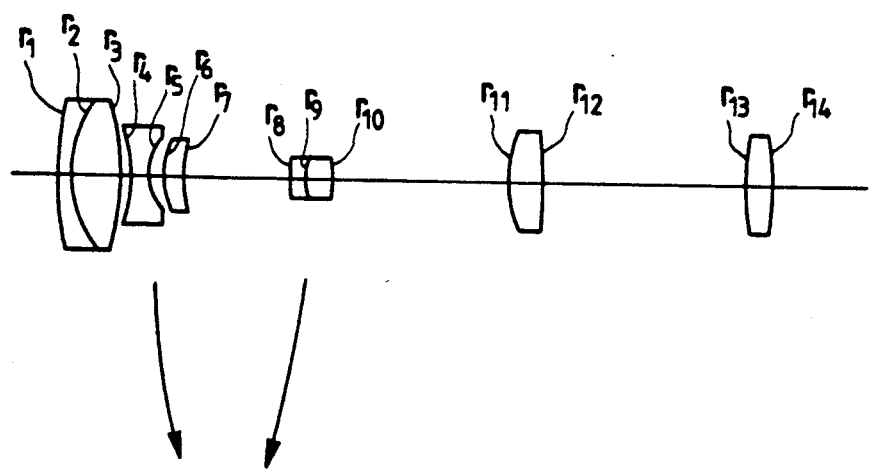
Figure 33:
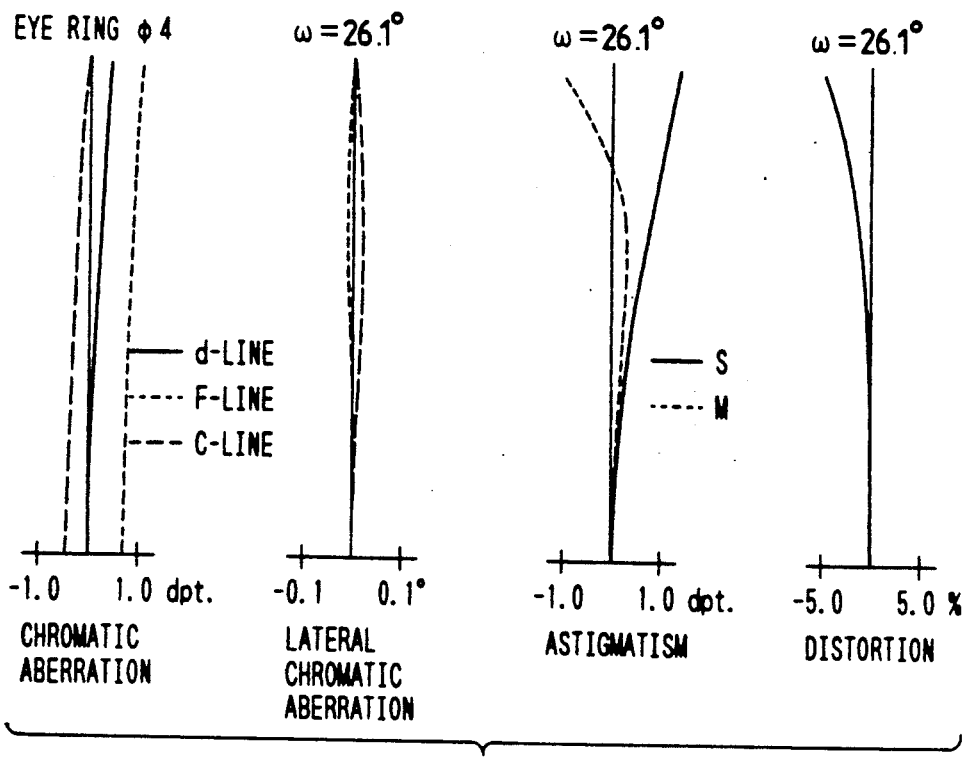
Figure 34:
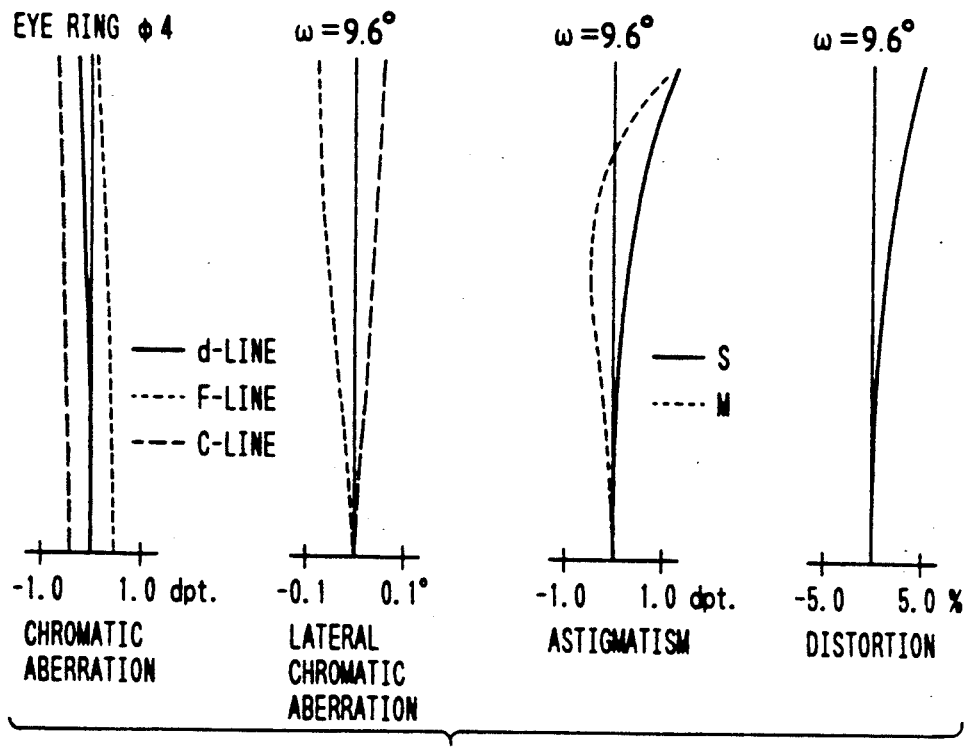

In the finder apparatus of the present invention, the second and third lens groups are moved in the directions indicated by arrows in FIGS. 8, 11, 14, 17, 20, 29 and 32 (Example 1–5 and 8 and 9) so as to effect zooming while correcting the change of eyesight through the finder that will occur upon zooming. This enables a high zoom ratio to be attained by the finder with minimum aberrational variations due to zooming. An even higher zoom ratio can be obtained if the first lens group is also moved as shown in FIGS. 23 and 26 (Example 6 and 7).

In order to form an exit pupil on an appropriate position behind the eyepiece (indicated by 110 in FIG. 8) of the eyepiece optical system, it is generally required that a condenser lens be positioned in the neighborhood of the focal point of the objective optical system. In the present invention, the first surface of the eyepiece system is provided with a curvature to serve as a condenser lens.

While a Porro prism is typically used to erect the image viewed through the finder, other erecting systems may be used such a the combination of a condenser lens and a mirror, or an image reversing relay lens system. In some applications such as astronomical telescopes, means for reversing the image are not necessary at all.

In most of the examples of the present invention set forth herein, the fourth lens group is simply made of a single lens element of large thickness. If desired, such a thick single lens (e.g. lens 107 in FIG. 8) may be replaced by an isosceles right triangular prism which is combined with subsequent optical members to form an image erecting optical system as shown in FIG. 1. Also, alternatively, an isosceles right triangular prism may be disposed between the third lens group and an eyepiece optical system. This arrangement is effective in achieving further reduction in the overall length of the system.

If at least one of the surfaces of the system of the present invention is rendered aspheric, compensation for aberrations such as distortion, astigmatism, spherical aberration and coma can be easily accomplished. Further, lenses may be made of resin materials and this offers the advantage that lenses of a desired shape can be easily fabricated.

The conditions that are to be satisfied by the finder apparatus of the present invention are described below.

Condition (1) relates to the degree of zooming that should be effected by the second lens group. If the focal length of the first lens group is written as $f_1$, the magnifications of the second and third lens groups at the wide-angle end as $m_{2W}$ and $m_{3W}$, respectively, the magnifications of the second and third lens groups at the telephoto end as $m_{2T}$ and $m_{3T}$, respectively, and the magnification of the fourth lens group as $m_4$, then the following relationships are established between the set of these parameters and $f_W$ (the focal length of the objective optical system as the wide-angle end) or $f_T$ (the focal length of the objective optical system at the telephoto end):

$$f_W = f_1 \cdot m_{2W} \cdot m_{3W} \cdot m_4 \quad \text{(i)}$$

$$f_T = f_1 \cdot m_{2T} \cdot m_{3T} \cdot m_4 \quad \text{(ii)}$$

If the zoom ratios of the objective optical system, the second lens group and the third lens group are respectively written as $Z$, $Z_2$ and $Z_3$, they may be expressed as follows from equations (i) and (ii):

$$Z = \frac{f_T}{f_W} = \frac{m_{2T}}{m_{2W}} = \frac{m_{3T}}{m_{3W}} = Z_2 \cdot Z_3 \quad \text{(iii)}$$

By taking the logarithms of both sides of equation (iii), it is rewritten as:

$$\log Z = \log Z_2 + \log Z_3 \quad \text{(iv)}$$

Let us here introduce parameters $N_2$ and $N_3$ as defined below:

$$\frac{\log Z_2}{\log Z} = N_2 \quad \text{(v)}$$

$$\frac{\log Z_3}{\log Z} = N_3 \quad \text{(vi)}$$

where $N_2 + N_3 = 1$. By using $N_2$ and $N_3$, the degrees of zooming that is effected by the second and third lens groups as compared with zooming by the objective optical system can be expressed.

Thus, the degrees of zooming that is effected by certain movable lens groups in a zoom lens system as compared with zooming by the overall system can be expressed by equations (v) and (vi). Condition (1) relates to $N_2$ defined by equation which may be properly adjusted to attain an increased zoom ratio of the second lens group by the finder while preventing undue increase in the overall length of the objective optical system. In a zoom lens system of a type that adopts the construction of the objective optical system of the present invention, the second and third lens groups are typically used as a variator and a compensator, respectively, and $N_2$ is nearly equal to unity. In this case, the second lens group is solely responsible for zooming by the zoom lens system and in order to attain a high zoom ratio, the second lens group must be moved by such a great amount that it becomes impossible to attain the purpose of reducing the overall length. Condition (1) sets forth the requirement that must be satisfied in order to shorten the overall length of the system by reducing the zoom ratio of the second lens group and making the third lens group also responsible for zooming. If the upper limit of this condition is exceeded, the movement of the second lens group becomes oo great to shorten the overall length of the system. If the lower limit of the condition is not reached, the movement of the third lens group becomes excessive, also making it impossible to shorten the overall length of the system.

Condition (2) sets forth the requirement that must be satisfied in order to control the curvature of field of the objective optical system by properly adjusting the power of the fourth lens group. If often occurs with such cameras as lens-shutter cameras and video cameras that restraints by the mechanical setup introduce difficulty in compensating for the curvature of field of the eyepiece optical system. To cope with this problem, the field curvature of the objective optical system must be brought into agreement with that of the eyepiece optical system so that the difference in eyesight between the center and the marginal area of the visual field of the finder can be corrected. By adjusting the power of the fourth lens group in such a way that condition (2) is satisfied, the Petzval sum of the objective optical system can be controlled to achieve agreement between its field curvature and that of the eyepiece optical system. If this condition is not met, the field curvature of the objective optical system becomes so great as to cause an excessive difference in eyesight between the center and the marginal area of the visual field of the finder.

Condition (3) sets forth the requirement that must be satisfied in order to properly adjust the focal length of the first lens group so that a higher zoom ratio can be attained by the finder while preventing excessive increase in the overall length of the objective optical system. The focal length of the first lens group is closely related to the overall length of the objective optical system and the zoom ratio that can be attained. If the focal length of the first lens group is increased, the overall length of the objective optical system also increases. If the focal length of the first lens group is shortened, the movement of the second lens group becomes too small to attain a high zoom ratio. If the upper limit of condition (3) is exceeded, the overall length of the objective optical system becomes excessive. If the lower limit of this condition is not reached, the movement of the second lens group becomes too small to attain the desired zoom ratio.

Condition (4) relates to the radius of curvature of the first surface of the eyepiece optical system. In order to construct a Porro prism or like device to erect the image viewed through the finder and to minimize the size of the eyepiece optical system, the effective aperture of the eyepiece optical system is desirably made small with respect to its overall length. In addition, it is necessary to insure a long eye relief. For these reasons, it is desired that nearly parallel rays of light pass through the interior of the eyepiece optical system. The finder apparatus of the present invention is designed to have a magnification of about 1.5 at the telephoto end. In this case, $f_L$, or the focal length of the objective optical system at the telephoto end is $1.5 f_e$. Further, in order to make a compact objective optical system while maintaining good optical performance, the distance (t) from the exit pupil of the objective optical system to the first surface of the eyepiece optical system is desirably in the range of from about $0.5 f_L$ to about $0.8 f_L$. Given these values, the eyepiece optical system permits the passage of parallel rays of light if the refractive power of the first surface of the eyepiece optical system is 1/t. Hence, the following relationship is established:

$$\frac{(n-1)}{r_{el}} = \frac{1}{t}$$

Wherein n is the refractive index of the optical member on the object side of the eyepiece optical system. If n is nearly equal to 1.5, this equation can be rewritten as $r_{el} = 0.5t$. Since $0.5f_L < t < 0.8f_L$ and $f_L = 1.5f_e$, condition (4) can be derived by substituting $r_{el} = 0.5t$ and $f_L = 1.5f_e$ into the relationship $0.5f_L < t < 0.8f_L$. If the upper limit of this condition is exceeded, the rays of light passing through the interior of the eyepiece optical system will spread so broadly that the size of the eyepiece optical system becomes excessive. If the lower limit of this condition is not reached, the rays of light passing through the eyepiece optical system will converge so much that not only does it become impossible to insure a long eye relief but excessive coma will also develop.

EXAMPLES

Seven examples of the present invention are described below with reference to data sheets, in which $2\omega$ denotes the real visual field of the finder covering both the wide-angle and telephoto ends, $r_i$, the radius of curvature of the ith surface, $d_i$, the aerial distance between the ith surface and the (i+1)th surface, $n_i$, the refractive index of the ith optical member at the d-line, and $\nu_i$, the Abbe number of the ith optical member.

The geometry of an aspheric surface may be expressed by the following well-known formula:

$$X = \frac{CY^2}{1 + \sqrt{1 - (1+K)C^2Y^2}} + A_4Y^4 + A_6Y^6 + A_8Y^8$$

In the following data sheets, zero is meant where the indication of asphericity coefficients is omitted.

Example 1

$2\omega = 52.2° \sim 19.4°$, exit pupil, 4 mm$^\phi$

| Surface No. | $r_i$ | $d_i$ | $n_i$ | $\nu_i$ |
|---|---|---|---|---|
| 1 | 20.441 | 1.50 | 1.58547 | 29.9 |
| 2 | 13.680 | 4.30 | 1.49186 | 57.4 |
| 3 | −20.132 | 1.02∼5.86 | | |
| 4 | −11.166 | 1.50 | 1.49186 | 57.4 |
| 5 | 3.008 | 1.12 | | |
| 6 | 5.175 | 2.05 | 1.49186 | 57.4 |
| 7 | 14.372 | 8.69∼0.50 | | |
| 8 | 9.600 | 1.50 | 1.58547 | 29.9 |
| 9 | 5.000 | 2.33 | 1.49186 | 57.4 |
| 10 | −6.930 | 0.50∼3.84 | | |
| 11 | −12.450 | 7.50 | 1.49186 | 57.4 |
| 12 | −12.000 | 12.20 | | |
| 13 | 10.154 | 28.03 | 1.49186 | 57.4 |
| 14 | ∞ | 0.20 | | |
| 15 | 20.982 | 2.55 | 1.49186 | 57.4 |
| 16 | −17.287 | | | |

Asphericity coefficient

Surface No. 1   $K = -0.67843531 \times 10^1$
Surface No. 3   $K = -0.11143750 \times 10^1$   $A_6 = 0.58584883 \times 10^{-6}$
Surface No. 5   $K = -0.87868797$   $A_6 = -0.30098075 \times 10^{-4}$
Surface No. 10  $K = -0.14044499 \times 10^1$   $A_6 = 0.20915375 \times 10^{-4}$
Surface No. 15  $K = -0.66340567 \times 10^{-1}$   $A_6 = -0.24104055 \times 10^{-5}$ $N_2 = 0.540$   $100/f_4 = 0.962$
$f_1/f_3 = 2.466$   $R_{el}/f_e = 0.509$

Example 2

$2\omega = 52.4° \sim 19.4°$, exit pupil, 4 mm$^\phi$

| Surface No. | $r_i$ | $d_i$ | $n_i$ | $\nu_i$ |
|---|---|---|---|---|
| 1 | 20.962 | 1.50 | 1.58547 | 29.9 |
| 2 | 14.219 | 4.30 | 1.49186 | 57.4 |
| 3 | −19.705 | 1.01∼5.83 | | |
| 4 | −11.211 | 1.50 | 1.49186 | 57.4 |
| 5 | 3.044 | 1.12 | | |
| 6 | 5.186 | 2.05 | 1.49186 | 57.4 |
| 7 | 13.854 | 8.69∼0.50 | | |
| 8 | 9.811 | 1.50 | 1.58547 | 29.9 |
| 9 | 5.000 | 2.33 | 1.49186 | 57.4 |
| 10 | −6.821 | 0.50∼3.87 | | |
| 11 | −12.597 | 7.50 | 1.49186 | 57.4 |
| 12 | −12.000 | 12.20 | | |
| 13 | 10.901 | 2.72 | 1.49186 | 57.4 |
| 14 | −106.249 | 17.23 | | |
| 15 | 20.627 | 2.50 | 1.49186 | 57.4 |
| 16 | −17.687 | | | |

Asphericity coefficient

Surface No. 1   $K = -0.69853580 \times 10^1$
Surface No. 3   $K = -0.13458219 \times 10^1$   $A_6 = 0.58492920 \times 10^{-6}$
Surface No. 5   $K = -0.87121564$   $A_6 = -0.35108134 \times 10^{-4}$
Surface No. 10  $K = -0.14494918 \times 10^1$   $A_6 = 0.18628684 \times 10^4$
Surface No. 15  $K = -0.66952880 \times 10^{-1}$   $A_6 = -0.25469236 \times 10^{-5}$ $N_2 = 0.538$   $100/f_4 = 0.999$
$f_1/f_3 = 2.482$   $R_{el}/f_e = 0.550$

Example 3

$2\omega = 52.4° \sim 19.2°$, exit pupil, 4 mm$^\phi$

| Surface No. | $r_i$ | $d_i$ | $n_i$ | $\nu_i$ |
|---|---|---|---|---|
| 1 | 17.021 | 1.50 | 1 80518 | 25.4 |
| 2 | 13.928 | 3.00 | 1.61800 | 63.4 |
| 3 | −234.166 | 0.66∼7.82 | | |
| 4 | −62.836 | 1.50 | 1.80400 | 46.6 |
| 5 | 7.549 | 14.34∼5.30 | | |
| 6 | 7.615 | 1.00 | 1.72825 | 28.5 |
| 7 | 3.820 | 2.00 | 1.53172 | 48.9 |
| 8 | −8.992 | 0.50∼2.38 | | |
| 9 | −15.156 | 7.50 | 1.51633 | 64.1 |
| 10 | −14.842 | 12.23 | | |
| 11 | 9.950 | 29.14 | 1.51633 | 64.1 |
| 12 | ∞ | 0.20 | | |
| 13 | 17.428 | 2.50 | 1.53113 | 62.4 |
| 14 | −25.656 | | | |

Asphericity coefficient
Surface No. 1   $K = -0.56920582$
Surface No. 13  $K = -0.31055168 \times 10^1$   $A_6 = -0.28376003 \times 10^{-6}$ $N_2 = 0.698$   $100/f_4 = 0.658$
$f_1/f_3 = 2.939$   $R_{el}/f_e = 0.495$

Example 4

$2\omega = 52.4° \sim 19.2°$, exit pupil, 4 mm$^\phi$

| Surface No. | $r_i$ | $d_i$ | $n_i$ | $\nu_i$ |
|---|---|---|---|---|
| 1 | 29.697 | 2.70 | 1.56873 | 63.1 |
| 2 | −41.744 | 0.44∼8.11 | | |
| 3 | −44.160 | 1.50 | 1.80400 | 46.6 |
| 4 | 9.779 | 15.56∼4.63 | | |
| 5 | 14.647 | 1.50 | 1.80518 | 25.4 |
| 6 | 5.000 | 2.30 | 1.66755 | 41.9 |
| 7 | −9.961 | 0.50∼3.76 | | |
| 8 | −14.450 | 7.50 | 1.51633 | 64.1 |

-continued

| | | | | |
|---|---|---|---|---|
| 9 | −14.521 | 14.14 | | |
| 10 | 10.668 | 28.46 | 1.51633 | 64.1 |
| 11 | ∞ | 0.20 | | |
| 12 | 21.388 | 2.30 | 1.60311 | 60.7 |
| 13 | −15.032 | 1.20 | 1.78472 | 25.7 |
| 14 | −21.862 | | | |

Asphericity coefficient

| | | |
|---|---|---|
| Surface No. 1 | $K = -0.65833785 \times 10^1$ | |
| Surface No. 2 | $K = -0.45719581 \times 10^{-1}$ | $A6 = 0.26579458 \times 10^{-6}$ |
| Surface No. 12 | $K = -0.64892742 \times 10^1$ | $A6 = -0.24652131 \times 10^{-6}$ |

| | |
|---|---|
| $N_2 = 0.539$ | $100/f_4 = 0.611$ |
| $f_1/f_3 = 3.341$ | $R_{el}/f_e = 0.530$ |

Example 5

$2\omega = 52.4° \sim 19.4°$  exit pupil, 4 mm$^\phi$

| Surface No. | $r_i$ | $d_i$ | $n_i$ | $\nu_i$ |
|---|---|---|---|---|
| 1 | 11.530 | 1.50 | 1.80518 | 25.4 |
| 2 | 9.317 | 3.88 | 1.56873 | 63.1 |
| 3 | 141.455 | 0.61~6.22 | | |
| 4 | 2411.715 | 1.50 | 1.80400 | 46.6 |
| 5 | 5.320 | 13.51~6.00 | | |
| 6 | 7.346 | 1.00 | 1.80515 | 25.4 |
| 7 | 3.973 | 2.00 | 1.53172 | 48.9 |
| 8 | 9.600 | 1.50~2.40 | | |
| 9 | −6.613 | 2.00 | 1.51633 | 64.1 |
| 10 | −7.534 | 15.84 | | |
| 11 | 9.421 | 30.48 | 1.51633 | 64.1 |
| 12 | ∞ | 0.20 | | |
| 13 | 36.476 | 2.50 | 1.77250 | 49.6 |
| 14 | −28.483 | | | |

Asphericity coefficient

Surface No. 1  $K = -0.25736010$

| | |
|---|---|
| $N_2 = 0.709$ | $100/f_4 = -0.249$ |
| $f_1/f_3 = 2.416$ | $R_{el}/f_e = 0.446$ |

Example 6

$2\omega = 52.2° \sim 14.6°$  exit pupil, 4 mm$^\phi$

| Surface No. | $r_i$ | $d_i$ | $n_i$ | $\nu_i$ |
|---|---|---|---|---|
| 1 | 12.417 | 1.50 | 1.59270 | 35.3 |
| 2 | 9.534 | 4.95 | 1.48749 | 70.2 |
| 3 | −130.372 | 1.20~8.37 | | |
| 4 | −13.458 | 1.50 | 1.49186 | 57.4 |
| 5 | 2.606 | 1.30 | | |
| 6 | 4.593 | 1.50 | 1.74950 | 35.3 |
| 7 | 7.081 | 9.20~1.95 | | |
| 8 | 7.485 | 1.00 | 1.83400 | 37.2 |
| 9 | 4.590 | 1.80 | 1.48749 | 70.2 |
| 10 | −10.131 | 0.50~6.13 | | |
| 11 | 13.939 | 8.00 | 1.49186 | 57.4 |
| 12 | 27.368 | 9.30 | | |
| 13 | 8.982 | 32.00 | 1.49186 | 57.4 |
| 14 | −14.311 | 1.00 | | |
| 15 | 12.498 | 3.50 | 1.58900 | 48.6 |
| 16 | −9.592 | 1.00 | 1.69895 | 30.1 |
| 17 | 25.866 | | | |

Asphericity coefficient

| | | |
|---|---|---|
| Surface No. 1 | $K = -0.21261354$ | $A4 = -0.97935539 \times 10^{-5}$ |
| | | $A8 = -0.10671989 \times 10^{-8}$ |
| Surface No. 5 | $K = -0.67136337$ | $A6 = -0.52313432 \times 10^{-4}$ |
| Surface No. 11 | $K = -0.20726593 \times 10^1$ | $A6 = -0.64584433 \times 10^{-5}$ |

| | |
|---|---|
| $N_2 = 0.732$ | $100/f_4 = 2.071$ |
| $f_1/f_3 = 2.513$ | $R_{el}/f_e = 0.456$ |

Example 7

$2\omega = 52.2° \sim 14.6°$  exit pupil, 4 mm$^\phi$

| Surface No. | $r_i$ | $d_i$ | $n_i$ | $\nu_i$ |
|---|---|---|---|---|
| 1 | 13.714 | 1.50 | 1.59551 | 39.2 |
| 2 | 11.956 | 6.34 | 1.48749 | 70.2 |
| 3 | −89.387 | 1.20~9.37 | | |
| 4 | −12.566 | 1.50 | 1.49186 | 57.4 |
| 5 | 2.509 | 1.30 | | |
| 6 | 4.736 | 1.50 | 1.74950 | 35.3 |
| 7 | 8.086 | 8.65~1.40 | | |
| 8 | 10.584 | 3.79 | 1.48749 | 70.2 |
| 9 | −14.083 | 0.50~3.30 | | |
| 10 | 10.993 | 8.00 | 1.49186 | 57.4 |
| 11 | 20.861 | 9.30 | | |
| 12 | 9.060 | 32.00 | 1.49186 | 57.4 |
| 13 | −16.589 | 1.00 | | |
| 14 | 11.851 | 3.50 | 1.60738 | 56.8 |
| 15 | −12.844 | 1.00 | 1.78472 | 25.7 |
| 16 | 32.188 | | | |

Asphericity coefficient

| | | |
|---|---|---|
| Surface No. 1 | $K = -0.14472544$ | $A4 = -0.16837054 \times 10^{-4}$ |
| | | $A8 = -0.83138880 \times 10^{-9}$ |
| Surface No. 5 | $K = -0.71060213$ | $A6 = -0.98383473 \times 10^{-4}$ |
| Surface No. 10 | $K = -0.40427126 \times 10^1$ | $A6 = -0.17941402 \times 10^{-4}$ |

| | |
|---|---|
| $N_2 = 0.889$ | $100/f_4 = 2.682$ |
| $f_1/f_3 = 2.568$ | $R_{el}/f_e = 0.457$ |

Example 8

$2\omega = 52.6° \sim 19.8°$  exit pupil, 4 mm$^\phi$

| Surface No. | $r_i$ | $d_i$ | $n_i$ | $\nu_i$ |
|---|---|---|---|---|
| 1 | 18.295 | 1.50 | 1.58547 | 29.9 |
| 2 | 10.875 | 4.30 | 1.49186 | 57.4 |
| 3 | −18.882 | 0.83~5.15 | | |
| 4 | −11.041 | 1.50 | 1.49186 | 57.4 |
| 5 | 2.880 | 1.56 | | |
| 6 | 6.123 | 2.05 | 1.49186 | 57.4 |
| 7 | 23.205 | 8.93~0.50 | | |
| 8 | 9.680 | 1.50 | 1.58547 | 29.9 |
| 9 | 5.000 | 2.33 | 1.49186 | 57.4 |
| 10 | −7.871 | 15.54~19.64 | | |
| 11 | 8.960 | 27.32 | 1.49186 | 57.4 |
| 12 | ∞ | 0.20 | | |
| 13 | 18.415 | 2.55 | 1.49186 | 57.4 |
| 14 | −18.210 | | | |

Asphericity coefficient

| | | |
|---|---|---|
| Surface No. 1 | $K = -0.66475739 \times 10^1$ | |
| Surface No. 3 | $K = -0.99662223$ | $A6 = 0.10215282 \times 10^{-5}$ |
| Surface No. 5 | $K = -0.11043028 \times 10^1$ | $A6 = -0.12343793 \times 10^{-4}$ |
| Surface No. 10 | $K = -0.14136083 \times 10^1$ | $A6 = 0.21809394 \times 10^{-4}$ |
| Surface No. 13 | $K = -0.64268915 \times 10^1$ | $A6 = -0.27092237 \times 10^{-5}$ |

| |
|---|
| $N_2 = 0.513$ |
| $f_1/f_3 = 2.374$ |
| $R_{el}/f_e = 0.460$ |

Example 9

$2\omega = 52.2° \sim 19.4°$  exit pupil, 4 mm$^\phi$

| Surface No. | $r_i$ | $d_i$ | $n_i$ | $\nu_i$ |
|---|---|---|---|---|
| 1 | 21.133 | 1.50 | 1.58547 | 29.9 |
| 2 | 11.543 | 4.42 | 1.49186 | 57.4 |
| 3 | −19.219 | 0.81~5.64 | | |
| 4 | −11.931 | 1.50 | 1.49186 | 57.4 |
| 5 | 3.580 | 1.50 | | |
| 6 | 6.380 | 2.01 | 1.49186 | 57.4 |
| 7 | 14.535 | 9.44~0.50 | | |
| 8 | 10.076 | 1.50 | 1.58547 | 29.9 |
| 9 | 5.000 | 2.32 | 1.49186 | 57.4 |
| 10 | −8.073 | 16.01~20.12 | | |
| 11 | 11.139 | 3.02 | 1.49186 | 57.4 |
| 12 | −36.167 | 18.47 | | |
| 13 | 20.044 | 2.48 | 1.49186 | 57.4 |
| 14 | −20.332 | | | |

Asphericity coefficient

Surface No. 1  $K =$

-continued

| | | |
|---|---|---|
| | $-0.66886643 \times 10^1$ | |
| Surface No. 3 | $K = -0.10104418 \times 10^1$ | $A6 = 0.79539756 \times 10^{-6}$ |
| Surface No. 5 | $K = -0.98530482$ | $A6 = -0.17248913 \times 10^{-4}$ |
| Surface No. 10 | $K = -0.17075487 \times 10^1$ | $A6 = 0.36601805 \times 10^{-5}$ |
| Surface No. 13 | $K = -0.65187390 \times 10^1$ | $A6 = -0.19302144 \times 10^{-5}$ |

$$N_2 = 0.523$$
$$f_1/f_3 = 2.406$$
$$R_{el}/f_e = 0.533$$

We claim:

1. A zoom finder comprising an objective optical system having a positive overall power and an eyepiece optical system having a positive overall power, said objective optical system comprising, in order from the object side, a first lens group having a positive power, a second lens group having a negative power, and a third lens group having a positive power, the image formed by said objective optical system being focused approximately at the first surface of said eyepiece optical system, said second and third lens groups being moved to effect zooming with the eyesight through the finder being held constant.

2. A zoom finder according to claim 1 wherein said objective optical system satisfies the following conditions (1) and (3)

$$0.4 < N_2 < 0.9$$

$$2.2 < f_1/f_s < 3.5$$

wherein $N_2$: the zoom ratio of the second lens group as compared to the zoom ratio of the objective optical system;
$f_1$: the focal length of the first lens group; and
$f_s$: the focal length of the objective optical system at the wide-angle end.

3. A zoom finder according to claim 1 wherein said eyepiece optical system satisfies the following condition (4):

$$0.375 < r_{e1}/f_e < 0.6$$

where $f_e$: the focal length of the eyepiece optical system; and
$r_{e1}$: the radius of curvature of the first surface of the eyepiece optical system.

4. A zoom finder according to claim 2 wherein said eyepiece optical system satisfies the following condition (4):

$$0.375 < r_{e1}/f_e < 0.6$$

where $f_e$: the focal length of the eyepiece optical system; and
$r_{e1}$: the radius of curvature of the first surface of the eyepiece optical system.

5. A zoom finder according to claim 1, wherein $0.4 < N_2 < 0.9$, where $N_2$ is the zoom ratio of the second lens group as compared to the zoom ration of the objective optical system.

6. A zoom finder according to claim 1, wherein $2.2 < f_1/f_s < 3.5$, where $f_1$ is the focal length of the first lens group and $f_2$ is the focal length of the objective optical system at the wide-angle end.

7. A zoom finder comprising an objective optical system having a positive overall power and an eyepiece optical system having a positive overall power, said objective optical system comprising, in order from the object side, a first lens group having a positive power, a second lens group having a negative power, a third lens group having a positive power and a fourth lens group having a weak power, the image formed by said objective optical system being focused approximately at the first surface of said eyepiece optical system, said second and third lens groups or said first to third lens groups being moved to effect zooming with the eyesight through the finder being held constant.

8. A zoom finder according to claim 7 wherein said objective optical system satisfies the following conditions (1)–(3):

$$0.4 < N_2 < 0.9$$

$$|100/f_4| < 3.0$$

$$2.2 \ f_1/f_s < 3.5$$

where $N_2$: the zoom ratio of the second lens group as compared to the zoom ratio of the objective optical system;
$f_i$: the focal length of the ith lens group; and
$f_s$: the focal length of the objective optical system at the wide-angle end.

9. A zoom finder according to claim 7 wherein said eyepiece optical system satisfied the following condition (4):

$$0.375 < r_{e1}/f_e < 0.6$$

where $f_e$: the focal length of the eyepiece optical system; and
$r_{e1}$: the radius of curvature of the first surface of the eyepiece optical system.

* * * * *